US006012633A

United States Patent [19]

Ochiai et al.

[11] Patent Number: 6,012,633

[45] Date of Patent: Jan. 11, 2000

[54] AUTOMATIC TRANSACTION APPARATUS

[75] Inventors: Satoru Ochiai; Masayuki Imai; Makoto Kurihara; Takehiro Imahayashi; Shuetsu Oikawa; Michiyasu Ozaki; Katsumasa Saito; Kazuya Ikoma, all of Kawasaki, Japan

[73] Assignee: Fujitsu Limited, Kawasaki, Japan

[21] Appl. No.: 09/053,493

[22] Filed: Apr. 2, 1998

[30] Foreign Application Priority Data

Aug. 14, 1997 [JP] Japan .................................... 9-219374

[51] Int. Cl.[7] ...................................................... G06F 17/60

[52] U.S. Cl. ................................ 235/379; 902/12; 902/17

[58] Field of Search .............................. 235/379; 902/12, 902/17

[56] References Cited

U.S. PATENT DOCUMENTS 5,900,607 5/1999 Awatsu et al. .......................... 235/379

*Primary Examiner*—Harold I. Pitts

*Attorney, Agent, or Firm*—Armstrong, Westerman, Hattori, McLeland & Naughton

[57] ABSTRACT

An automatic transaction apparatus for allowing users to deposit money in the form of financial documents such as checks has a depository inlet, a document feed mechanism, a reading mechanism, a printing mechanism, and a storage mechanism, all for automatically settling financial documents deposited by users. The depository inlet has a guidance mechanism for indicating a pattern in which to insert the financial document into the depository inlet. According to the pattern indicated by the guidance mechanism, the user can insert the financial document with face and back sides properly directed and in a proper orientation into the depository inlet. Since the financial document is properly inserted into the depository inlet, the automatic transaction apparatus may have a relative simple document deposition mechanism for processing the inserted financial document as the document deposition mechanism does not need to handle financial documents inserted in different patterns.

14 Claims, 25 Drawing Sheets

AUTOMATIC TRANSACTION APPARATUS

BACKGROUND OF THE INVENTION

1. Field of the Invention

The present invention relates to an automatic transaction apparatus for allowing users or customers to deposit money in the form of financial documents such as checks, and more particularly to an automatic transaction apparatus for automatically settling deposits when operated by customers.

2. Description of the Related Art

Financial institutions find a wide use of automatic transaction apparatus. Automatic transaction apparatus are operated by customers to automatically make deposits and withdrawals. In Europe and America, it is popular to deposit money in the form of checks in banking and financial institutions. Since checks are manually processed in back offices, it requires a large expenditure of personnel expenses to process checks. For this reason, there has been a demand for automatic transaction apparatus with an ability to automatically process checks.

FIG. 27 of the accompanying drawings illustrates a check.

For depositing a check in an automatic transaction apparatus, the customer first puts the check into an envelope, and then inserts the envelope into the automatic transaction apparatus. The envelope collected from the automatic transaction apparatus is opened in a back office. After the check removed from the envelope is received, its sum is confirmed, and an MICR (magnetic ink character recognition) mark is manually printed in the sum column. Then, the check is processed by a check processing apparatus.

Because the automatic transaction apparatus is automatized to only receive checks, the checks received by the automatic transaction apparatus need to be manually processed in the back office. Furthermore, it will take some time to cash the checks due to a time-consuming check settling process.

Attempts have heretofore been made to add a check processing capability to automatic transaction apparatus. The face of a check of the type which is widely used is shown in FIG. 27. As shown in FIG. 27, a check 100 has on a lower portion of its face an MICR column 101 marked with MICR numerals printed in a magnetic ink which are representative of the code of a banking institution which has issued the check, the code of the issuer, and an issuance serial number.

The check 100 also carries on an upper portion of its face the name 102 of the issuer and a data 105 of issuance, and on a middle portion of its face the name 103 of a party to which the check is payable, the sum 104 to be paid which is expressed by numerals, and the sum 106 to be paid which is expressed by alphabetical letters.

An automatic transaction apparatus for automatically processing the check 100 has a reading unit and a printing unit. The reading unit comprises an image reader and a magnetic head. The image reader optically reads the face of the check 100 which has been inserted by the customer, and recognizes the numerals of the sum 104. The magnetic head recognizes the banking institution which has issued the check, the issuer, and the issuance serial number.

The automatic transaction apparatus sends the recognized data to a host computer. The host computer settles the check 100 and transfers settled data back to the automatic transaction apparatus. In the automatic transaction apparatus, an MICR encoder of the printing unit prints a settled sum in the MICR column 101 of the check 100. The printing unit also prints the data of transaction and the account number on the check 100. The automatic transaction apparatus then stores the check 100.

In this manner, the automatic transaction apparatus automatically processes checks with the reading unit and the printing unit.

Checks have face and back sides and different orientations. Therefore, checks may be inserted into automatic transaction apparatus with the face side or the back side up and/or in different orientations. Heretofore, automatic transaction apparatus are required to have a plurality of reading units and a plurality of printing units in order to cope with the different patterns in which checks are inserted into the automatic transaction apparatus. Accordingly, the automatic transaction apparatus have been large in size because of a complex and large check deposition mechanism that is required.

If a check deposition mechanism has a single reading unit and a single printing unit, then it additionally needs a complex reversal mechanism for bringing the faces of inserted checks in one direction and a complex aligning mechanism for orienting inserted checks in alignment for processing. These additional mechanisms tend to increase the time required for checks to be properly deposited in the automatic transaction apparatus, and are also liable to cause an inserted check to be jammed. These problems have prevented users from relying on the automatic transaction apparatus in depositing checks.

SUMMARY OF THE INVENTION

It is an object of the present invention to provide an automatic transaction apparatus having a relatively simple check deposition mechanism for automatically processing financial documents that are deposited.

Another object of the present invention to provide an automatic transaction apparatus having a relatively small check deposition mechanism for automatically processing financial documents that are deposited.

Still another object of the present invention to provide an automatic transaction apparatus which is capable of allowing financial documents to be deposited in a relatively short period of time.

To achieve the above objects, there is provided in accordance with the present invention an automatic transaction apparatus for automatically settling financial documents deposited by users, comprising a depository inlet for receiving a financial document deposited by a user, document feed means for feeding the financial document received by the depository inlet, reading means for reading transaction data from the financial document, printing means for printing a transactional result on the financial document, and storage means for storing the financial document. The automatic transaction apparatus also includes guidance means disposed in the depository inlet, for indicating a pattern in which to insert the financial document into the depository inlet.

The guidance means, which is disposed in the depository inlet, indicates a pattern in which to insert the financial document into the depository inlet. Therefore, when the user inserts the financial document according to the pattern indicated by the guidance means, the financial document can be inserted with its sides properly directed and in a proper orientation into the depository inlet.

Since the financial document is properly inserted into the automatic transaction apparatus, they can automatically be deposited by a relatively simple deposition mechanism which includes the reading means and the printing means. The deposition mechanism may be relatively small in size, preventing the automatic transaction apparatus from having an increased size.

The automatic transaction apparatus can process deposits in the form of financial documents in a relatively short period of time for the convenience of users.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
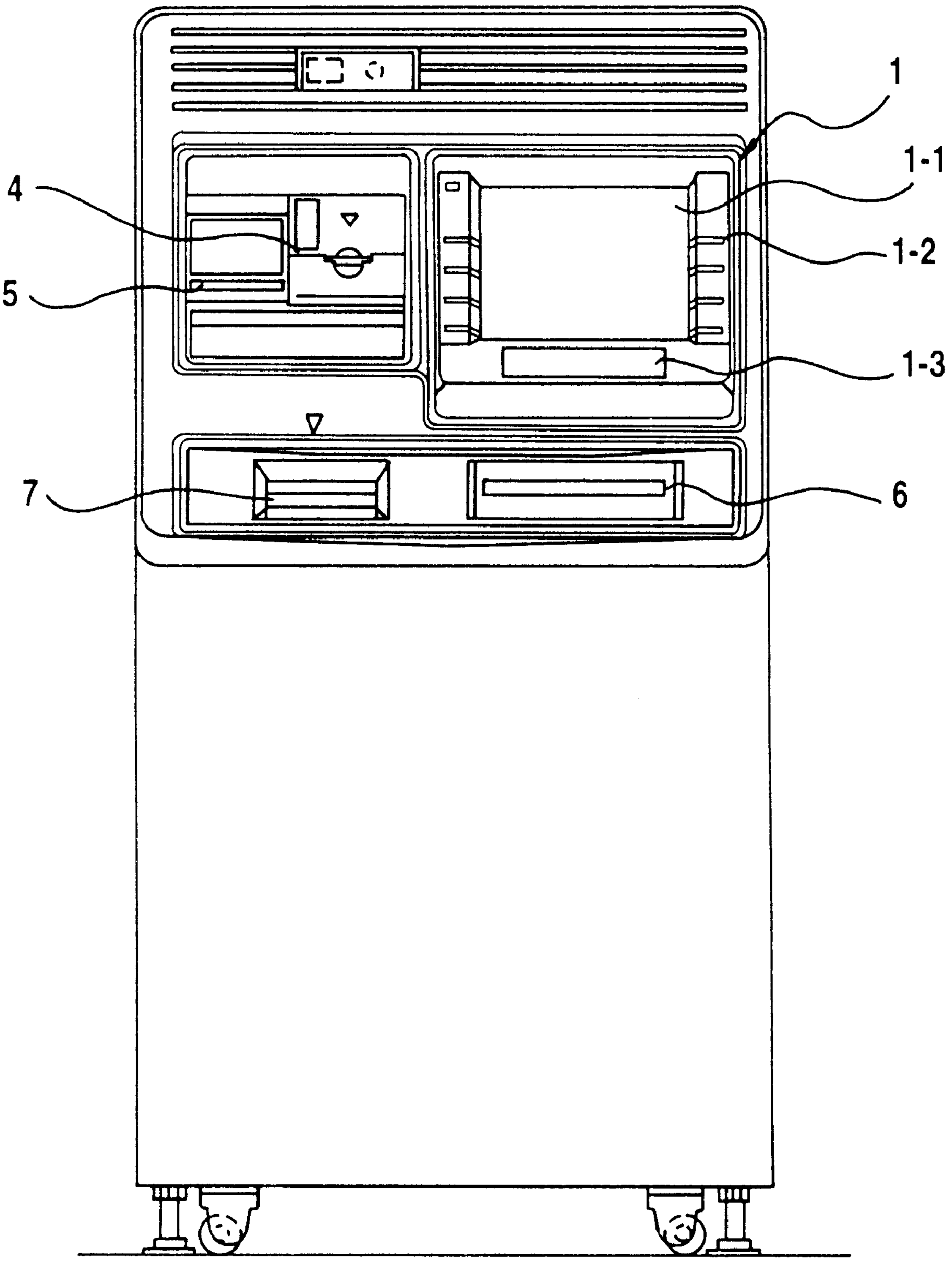
FIG. 1 is a front elevational view of an automatic transaction apparatus according to an embodiment of the present invention.

As shown in FIG. 1, an automatic transaction apparatus according to an embodiment of the present invention has a customer-operated console 1 including a display unit 1-1 for displaying images for guiding customers or users to operate the automatic transaction apparatus, an array of switches 1-2 for selecting items in displayed images, and an array of input keys 1-3 for entering a password, a sum, etc. The automatic transaction apparatus also has a card processing unit 4 for receiving and reading a user's card, and returning the user's card after a transaction is finished.

The automatic transaction apparatus further includes an envelope discharger 5 for discharging an envelope when the user selects a deposition using an envelope, a withdrawal processing unit 6 for discharging an indicated sum of cash when the user selects a withdrawal, and a depository inlet 7 having an inlet slot for receiving an envelope or a check which is inserted by the user for a deposit.

Figure 2:
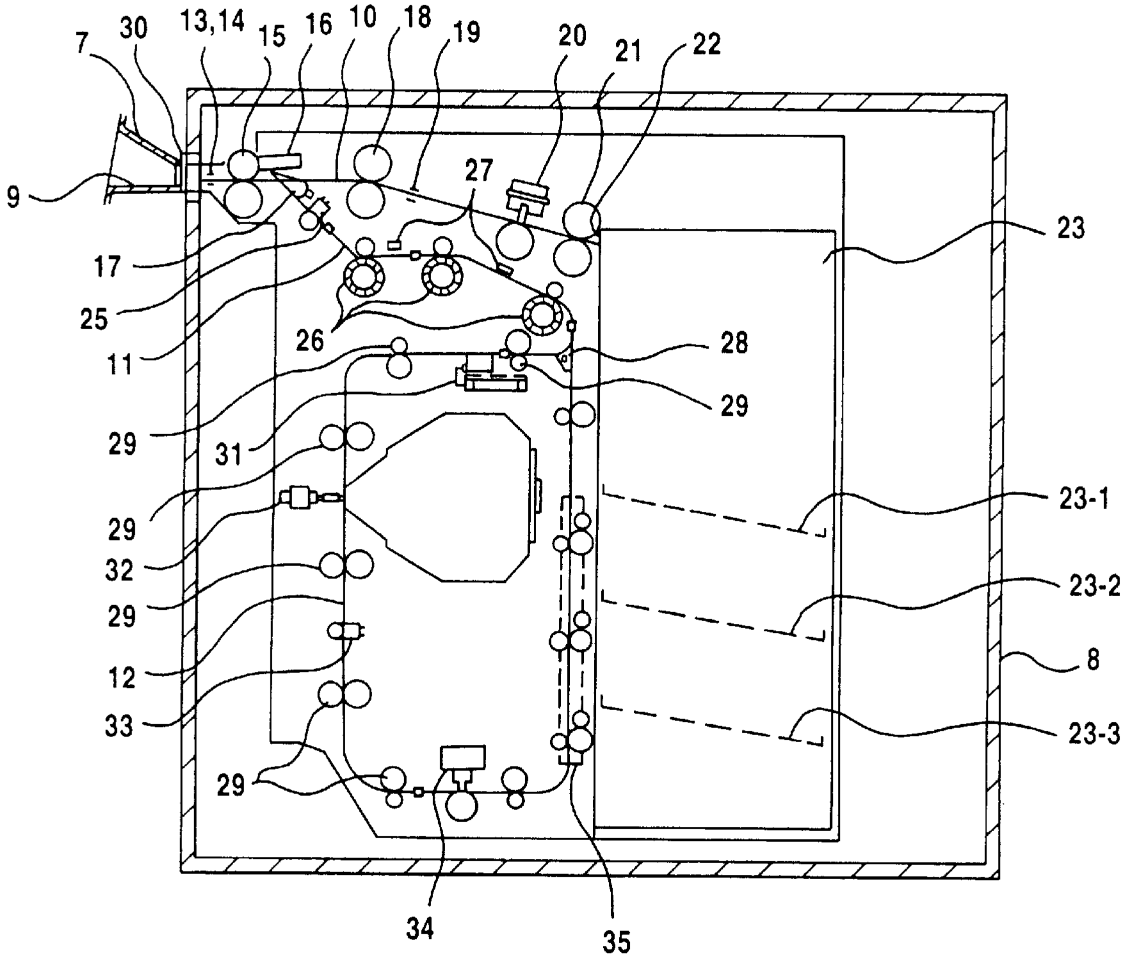
FIG. 2 is a cross-sectional view of a check deposition mechanism of the automatic transaction apparatus shown in FIG. 1.
Figure 3:
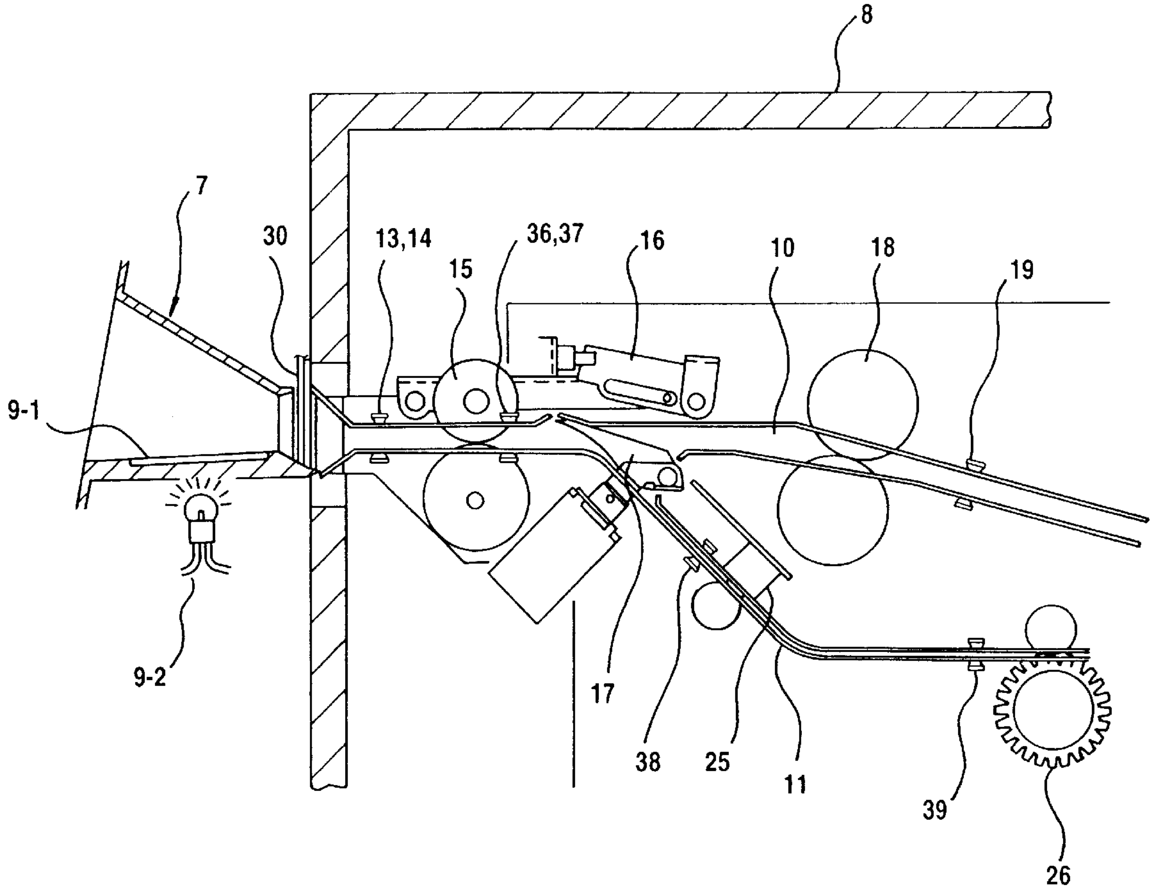
FIG. 3 is an enlarged fragmentary cross-sectional view of the check deposition mechanism shown in FIG. 2.
Figure 4:
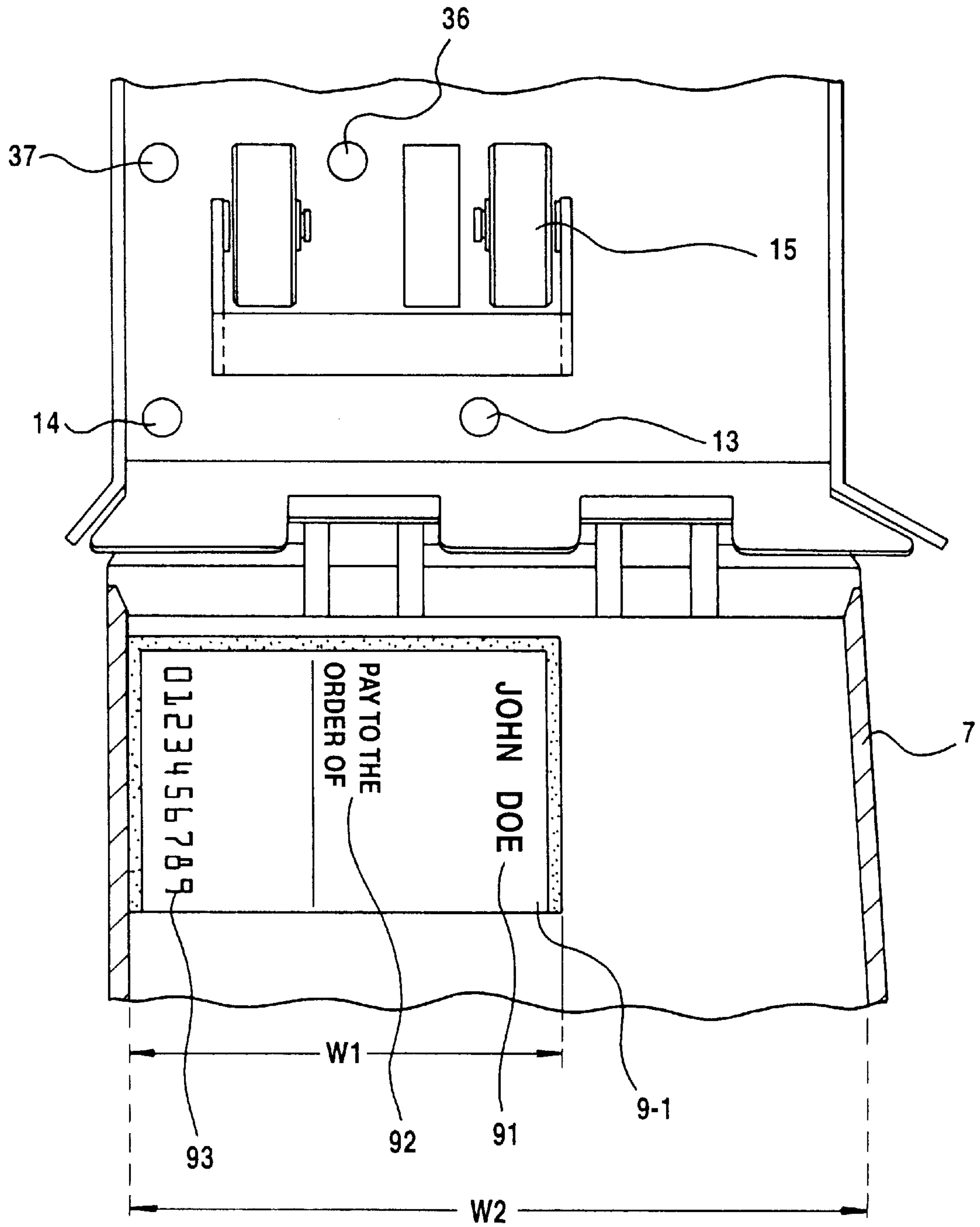
FIG. 4 is a fragmentary plan view of a depository structure of the check deposition mechanism shown in FIG. 2.

FIG. 2 shows a check deposition mechanism of the automatic transaction apparatus shown in FIG. 1. FIG. 3 shows the check deposition mechanism, and FIG. 4 shows the depository inlet 7.

As shown in FIGS. 2 and 3, the depository inlet 7 serves to receive both an envelope and a check that are inserted from outside of a safe 8. As shown in FIG. 4, the depository inlet 7 has a width W2 equal to the width of envelopes that are used in connection with the automatic transaction apparatus. The depository inlet 7 includes a guidance mechanism 9 which comprises an insertion guidance panel 9-1 and a backlight lamp 9-2 positioned underneath the insertion guidance panel 9-1.

The insertion guidance panel 9-1 has a width W1 equal to the width of personal checks that are used most often in connection with the automatic transaction apparatus. The insertion guidance panel 9-1 is positioned such that its left edge, as viewed from above, is aligned with the left edge of the depository inlet 7. The insertion guidance panel 9-1 indicates thereon a pattern on the face of a personal check 100 (see FIG. 23). Specifically, the insertion guidance panel 9-1 indicates thereon a column 91 showing an issuer's name, a column 92 showing a party to which the check is payable, and an MICR column 93.

These columns 91, 92, 93 indicated on the insertion guidance panel 9-1 serve to guide the user to insert the check 100 with its face side up in a direction which is a longitudinal direction of the check 100, and also guide the user to insert the check 100 at a left-hand side of the depository inlet 7. Since the user is guided by the insertion guidance panel 9-1 as to how to insert the check 100 into the depository inlet 7, the check deposition mechanism of the automatic transaction apparatus may be relatively simple in construction and can process inserted checks within a relatively short period of time.

As shown in FIGS. 2 and 3, the depository inlet 7 is associated with a pair of laterally spaced transmissive sensors 13, 14, a plurality of reception rollers 15, a thickness detector 16, and a pair of laterally spaced transmissive sensors 36, 37. As shown in FIG. 4, the transmissive sensors 13, 14 serve to detect the width of a medium (either an envelope or a check) which has been inserted from the depository inlet 7. If a medium whose width is smaller than the distance between the transmissive sensors 13, 14 is inserted, then the inserted medium is returned to the depository inlet 7 by the reception rollers 15 that are rotated in response to a signal from the transmissive sensors 13, 14.

The thickness detector 16 serves to detect the thickness of a medium which has been inserted from the depository inlet 7, as described later on with respect to FIGS. 5A and 5B. If an inserted medium has a thickness greater than a predetermined thickness as detected by the thickness detector 16 when a check deposition mode has been selected, then the inserted medium is returned to the depository inlet 7 by the reception rollers 15 that are rotated in response to a signal from the thickness detector 16.

As shown in FIG. 4, the transmissive sensors 13, 36, 37 jointly serve to detect the skew of an inserted medium. If the skew of an inserted medium is greater than a predetermined angle as detected by the transmissive sensors 13, 36, 37, then the inserted medium is returned to the depository inlet 7 by the reception rollers 15 that are rotated in response to a signal from the transmissive sensors 13, 36, 37.

As shown in FIGS. 2 and 3, a selector lever 17 is positioned immediately downstream of the transmissive sensors 36, 37 for selecting an envelope feed path 10 or a check feed path 11. The envelope feed path 10 is associated with a plurality of feed rollers 18, 21, a pair of transmissive sensors 19, 22, and a printing mechanism (envelope printer) 20 for printing reception information on an inserted envelope.

In an envelope deposition mode, an envelope inserted from the depository inlet 7 is introduced into the envelope feed path 10 selected by the selector lever 17, and then printed by the printing mechanism 20. Thereafter, the printed envelope is stored in a storage bin 23. If the transmissive sensor 20 is turned on when the transmissive sensor 13 is turned off, it is determined that the length of the inserted envelope exceeds a maximum limit, and the inserted envelope is returned to the depository inlet 7. If the transmissive sensor 19 is not turned on when the transmissive sensor 13 is turned off, it is determined that the length of the inserted envelope is smaller than a minimum limit, and the inserted envelope is returned to the depository inlet 7.

As shown in FIG. 3, the check feed path 11 is associated with a magnetic sensor 25, a pair of transmissive sensors 38, 39, a plurality of transverse shifting rollers 26, and a pair of transverse shift detecting mechanisms 27. The magnetic sensor 25 serves to detect whether there are MICR characters preprinted on an inserted check 100. If the magnetic sensor 25 does not detect MICR characters, then the inserted check 100 is returned to the depository inlet 7.

The magnetic sensor 25 does not detect MICR characters when a check has been inserted in a wrong orientation or when a check with no preprinted MICR characters has been inserted. Since a check that has been inserted in a wrong orientation is also returned, the user can recognize the proper orientation in which the check has to be inserted.

If the transmissive sensor 39 is turned on when the transmissive sensor 13 is turned off, it is determined that the length of the inserted check exceeds a maximum limit, and the inserted check is returned to the depository inlet 7. If the transmissive sensor 38 is not turned on when the transmissive sensor 13 is turned off, it is determined that the length of the inserted check is smaller than a minimum limit, and the inserted check is returned to the depository inlet 7.

When the check is thus returned, a message indicating why the check is returned is visibly displayed on the display unit 1-1 and also audibly announced, prompting the user to insert the check properly. Inasmuch as the manner in which the user has inserted the check is checked before the check is processed by the automatic transaction apparatus, the check that has been inserted in a proper orientation can be delivered to the check deposition mechanism.

The transverse shifting rollers 26 serve to feed the check 100 along the check feed path 11 and also to transversely shift the check 100 strongly against respective reference guides. There are three transverse shifting rollers 26 spaced along the check feed path 11. The transverse shifting rollers 26 will be described in detail later on with reference to FIGS. 6A and 6B.

Each of the transverse shift detecting mechanisms 27 detects whether a check 100 has been transversely shifted against the reference guide or not. If the transverse shift detecting mechanism 27 detects that the check 100 has not been transversely shifted against the reference guide, then the transverse shifting roller 26 which is associated with the transverse shift detecting mechanism 27 re-tries to feed the check 100. Specifically, the transverse shifting roller 26 feeds the check 100 backward, and then transversely shifts the check 100 while feeding it forward. The transverse shifting roller 26 re-tries to feed the check 100 until the transverse shift detecting mechanism 27 detects that the check 100 has been transversely shifted against the reference guide. The transverse shift detecting mechanisms 27 will be described in detail later on with reference to FIGS. 7 and 8.

The check feed path 11 serves as a first feed path for detecting and transversely shifting a check. The first feed path 11 is connected to a second feed path 12 at a switching gate 28 (see FIG. 1), described later on. The second feed path 12 is shaped like a loop path.

The second feed path 12 is associated with a plurality of feed rollers 29, an image reader 31, an encoder 32, a magnetic reader 33, a printing mechanism 34, a storage mechanism 35, and a switching gate 28.

The feed rollers 29 feed a check 100 while applying weak forces tending to transversely shift the check 100. The feed rollers 29 will be described in detail later on with reference to FIG. 9. After the check 100 has been transversely shifted in the first feed path 11, the feed rollers 29 keep the check 100 transversely shifted under the weak forces which are applied to the check 100 by the feed rollers 29.

The image reader 31 optically reads one side of the check 100. The encoder 32 prints information with magnetic ink in the MICR column 101 of the check 100. The magnetic reader 33 reads the information printed in the MICR column 101 of the check 100. The printing mechanism 34 prints reception information (AUDIT) and endorsing information (ENDORSEMENT) on the check 100.

The storage mechanism 35 stores the check 100 in the second feed path 12 into a specified storage chamber in the storage bin 23. The storage bin 23 is compartmented into an envelope storage chamber and three check storage chambers by a plurality of partition trays 23-1–23-3. The storage mechanism 35 will be described in detail later on with reference to FIGS. 10, 11, and 12.

For endorsing the check 100, it is necessary to reverse the check 100 upside down. The switching gate 28 introduces the check 100 from the first feed path 12 into the second feed path 11 and then delivers the check 100 from the second feed path 12 back into the first feed path 11, for reversing the check 100 upside down. A reversal mechanism which includes the switching gate 28 will be described in detail later on with reference to FIGS. 13 and 14.

The various components of the automatic transaction apparatus will be described below with reference to FIGS. 5A, 5B through 14.

Figure 5A:
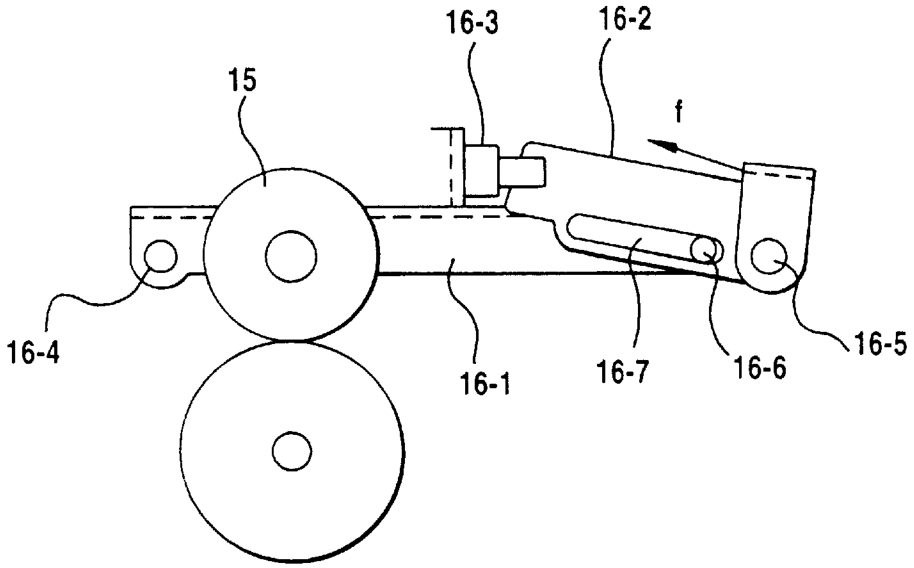
FIGS. 5A and 5B are side elevational views of a thickness detector of the check deposition mechanism shown in FIG. 2.
Figure 5B:
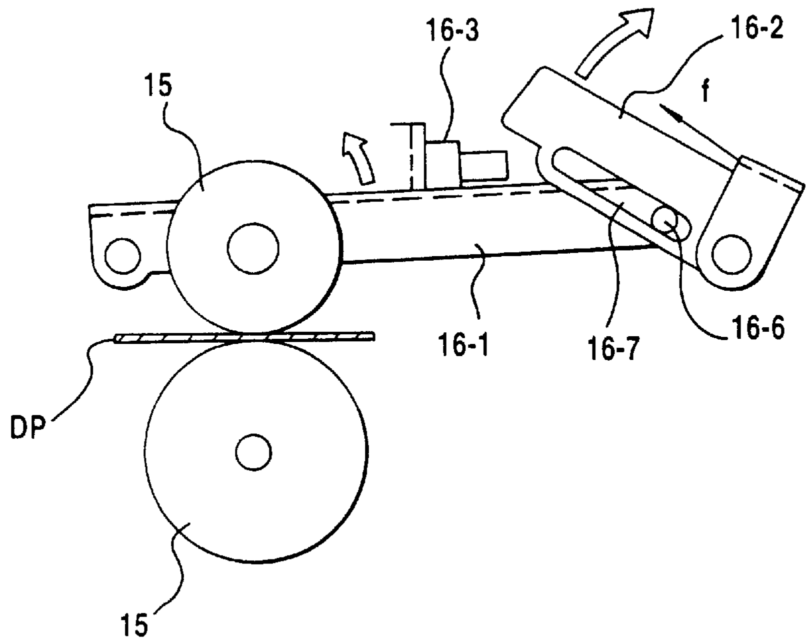

As shown in FIG. 5A, the thickness detector 16 has a pair of first and second levers 16-1, 16-2 and a photointerrupter 16-3. The first lever 16-1 is rotatable about a pivot 16-4 at one end thereof. The reception rollers 15 are rotatably supported on the first lever 16-1. A guide rod 16-6 is mounted on an end of the first lever 16-1 remote from the pivot 16-4.

The second lever 16-2 is rotatable about a pivot 16-5 at one end thereof, and has a guide groove 16-7 defined therein intermediate between its opposite ends. The guide rod 16-6 on the first lever 16-1 is movably guided in the guide groove 16-7. The second lever 16-2 has an end remote from the pivot 16-5 for blocking a light path of the photointerrupter 16-3. The second lever 16-2 is normally urged to turn in the direction indicated by the arrow "f" by a spring (not shown).

When no medium is sandwiched by the reception rollers 15 as shown in FIG. 15A, the end of the second lever 16-2 blocks the light path of the photointerrupter 16-3. When a medium is sandwiched by the reception rollers 15 as shown in FIG. 5B, the first lever 16-1 is turned about the pivot 16-4, causing the second lever 16-2 to be turned about the pivot 16-5.

If the thickness of the medium is greater than a predetermined thickness, then the second lever 16-2 is angularly moved to displace its end out of the light path of the photointerrupter 16-3. The thickness detector 16 is capable of detecting that an inserted medium has a thickness greater than a predetermined thickness of 0.5 mm, for example, when in the check deposition mode. The thickness detector 16 is of a small size, yet can amplify the thickness of an inserted medium.

Figure 6A:
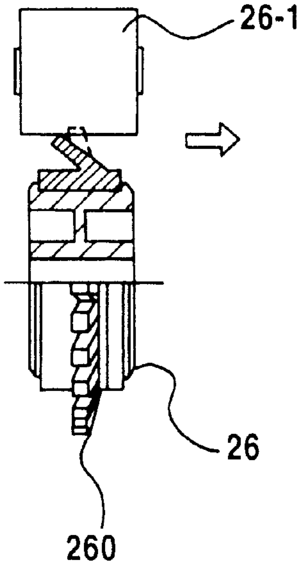
FIGS. 6A and 6B are front and side elevational views of a transverse shifting mechanism of the check deposition mechanism shown in FIG. 2.
Figure 6B:
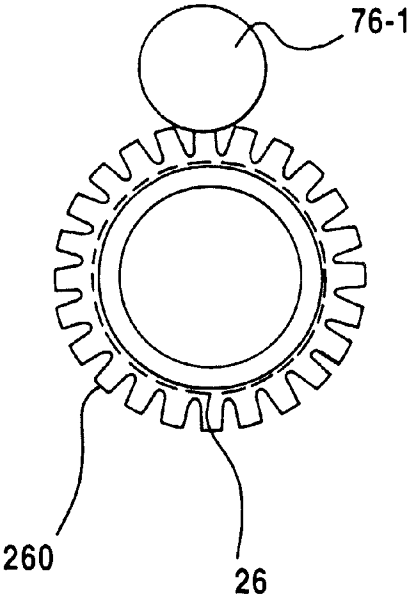

As shown in FIGS. 6A and 6B, each of the transverse shifting rollers 26 has a petal-shaped radial transverse shifter 260 on its outer circumferential edge. As shown in FIG. 6A, the petal-shaped radial transverse shifter 260 flexes radially inwardly by contact with a facing roller 26-1. Under the resiliency of the petal-shaped radial transverse shifter 260 which has thus flexed, the petal-shaped radial transverse shifter 260 applies forces tending to transversely shift the check 100 in the direction indicated by the arrow perpendicularly to the direction in which the check 100 is fed. Each of the transverse shifting rollers 26 is thus relatively simple in structure, but capable of transversely shifting the check 100 strongly.

Figure 7:
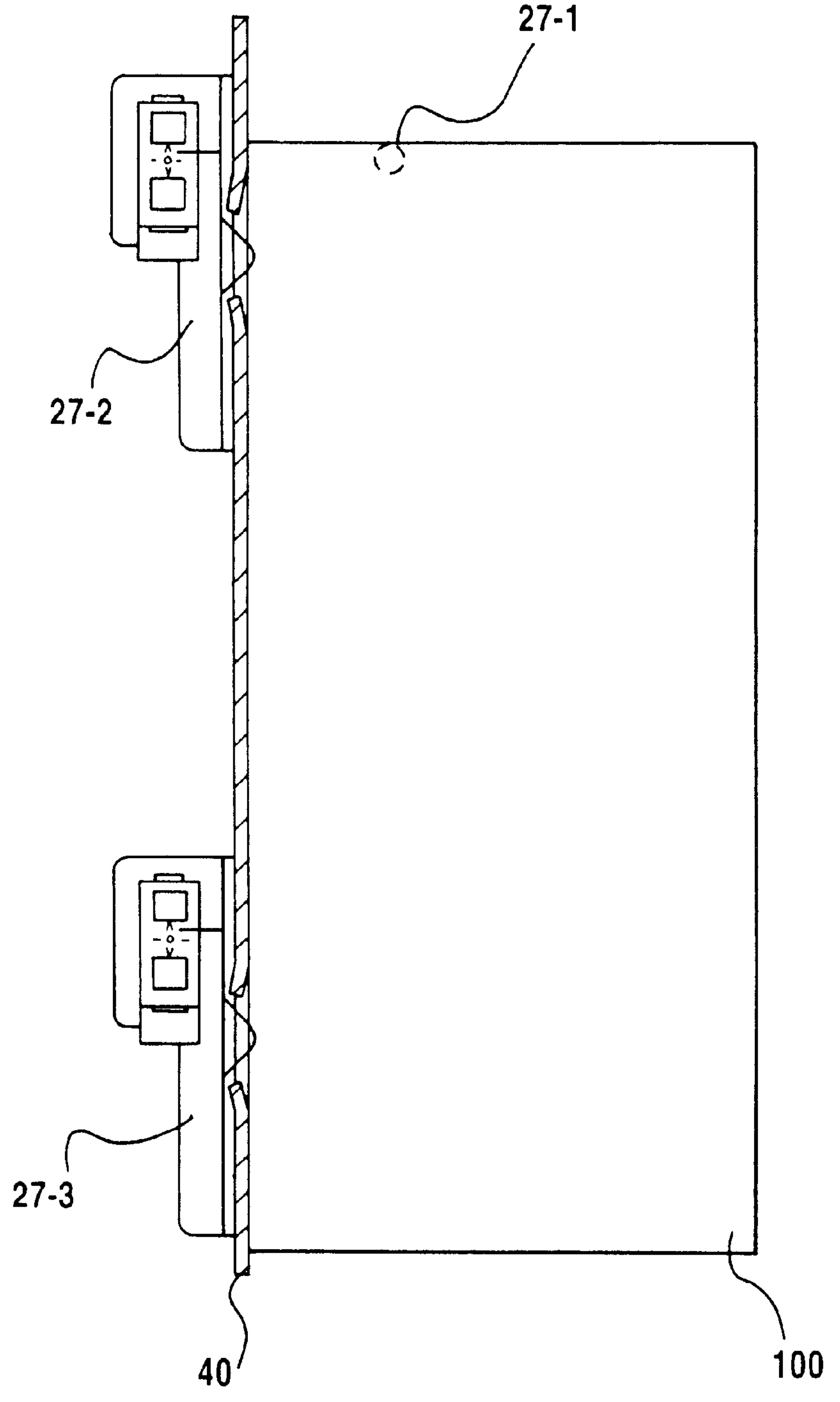
FIG. 7 is a plan view of a transverse shift detecting mechanism of the check deposition mechanism shown in FIG. 2.

As shown in FIG. 7, each of the transverse shift detecting mechanisms 27 comprises a photosensor 27-1 for detecting a check 100 and a pair of sensors 27-2, 27-3 mounted on a reference guide 40 disposed on one side of the photosensor 27-1.

Figure 8:
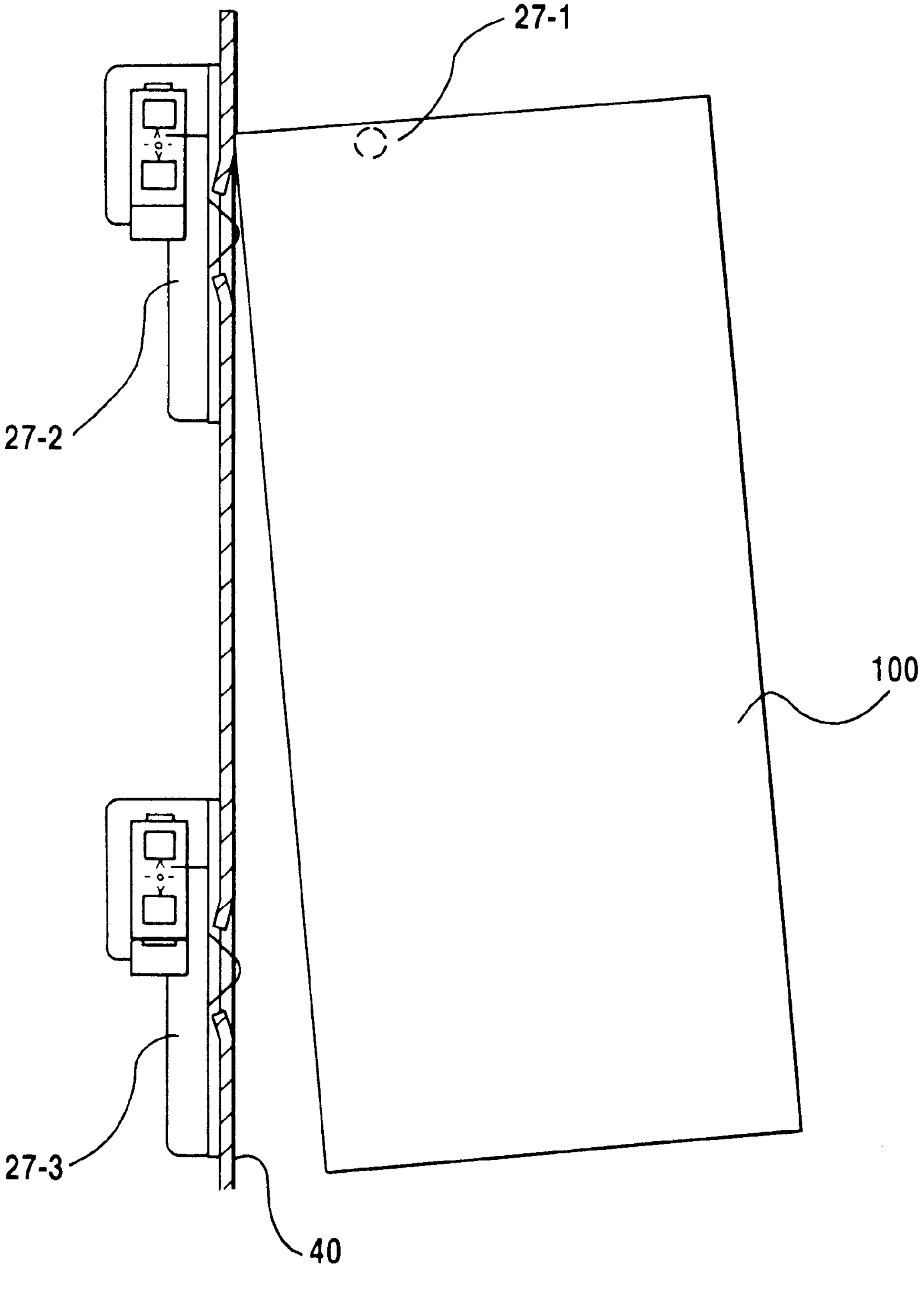
FIG. 8 is a plan view illustrating the manner in which the transverse shift detecting mechanism shown in FIG. 7 operates.

When the check 100 is properly transversely shifted against the reference guide 40 as shown in FIG. 7, all the sensors 27-1, 27-2, 27-3 are turned on. When the check 100 is not properly transversely shifted against the reference guide 40 as shown in FIG. 8, either one of the sensors 27-1, 27-2, 27-3 is turned off. Therefore, the sensors 27-1, 27-2, 27-3 are capable of detecting whether the check 100 is completely transversely shifted against the reference guide 40.

Figure 9:
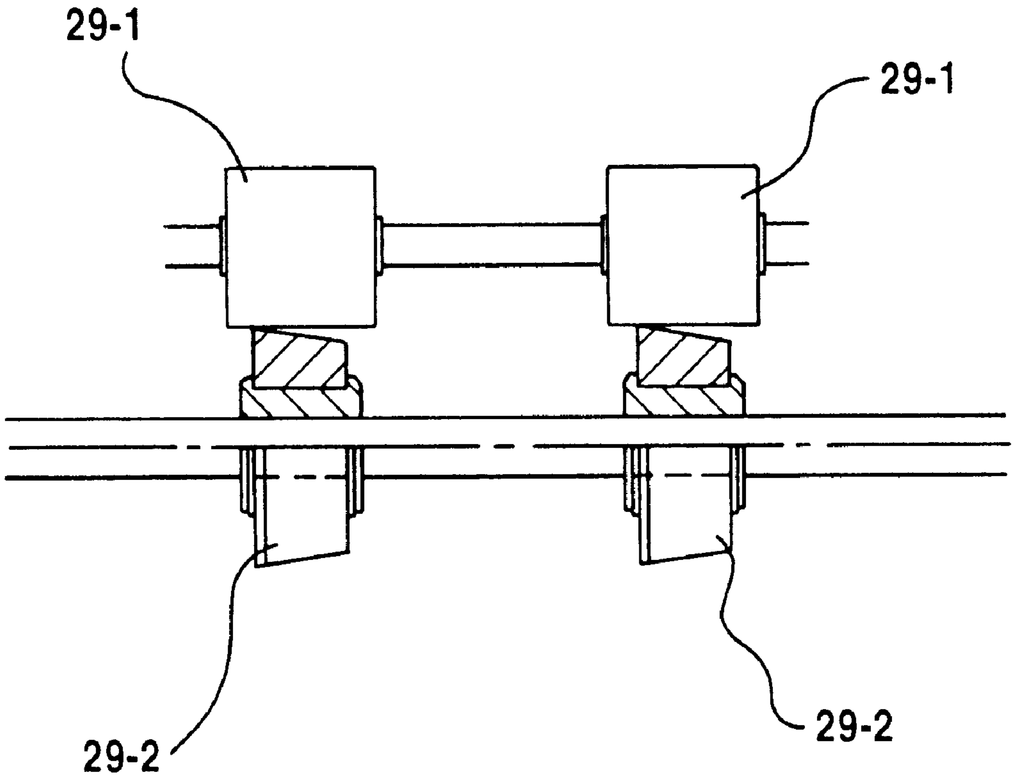
FIG. 9 is a front elevational view of a feed roller of the check deposition mechanism shown in FIG. 2.

As shown in FIG. 9, each of the feed rollers 29 associated with the second feed path 12 comprises a pair of feed rollers 29-2 each having a frustoconical cross section and a pair of facing rollers 29-1 held in rolling contact with the feed rollers 29-2, respectively, for feeding a check 100 sandwiched therebetween. The feed rollers 29-2 each having a frustoconical cross section are capable of applying weak transversely shifting forces to the check 100. Consequently, the check 100 that has been transversely shifted in the first feed path 11 remain transversely shifted in the second feed path 12.

Figure 10:
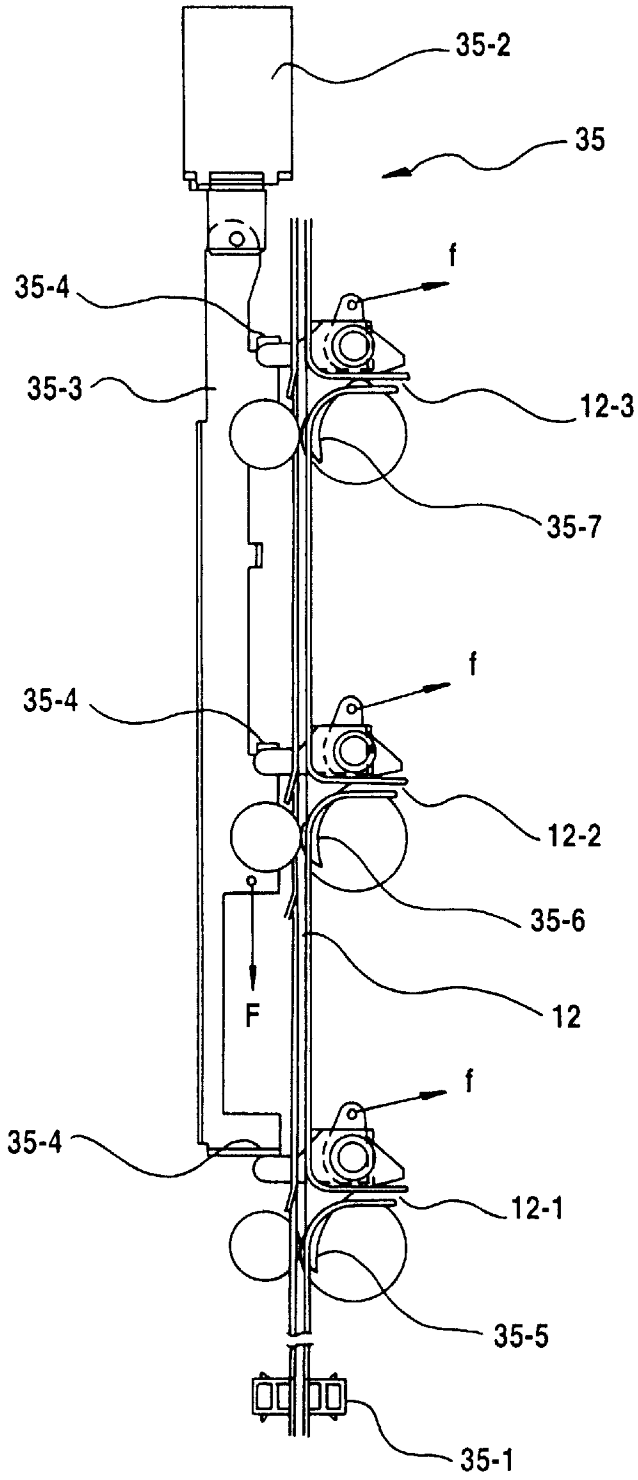
FIG. 10 is a side elevational view of a storage mechanism of the check deposition mechanism shown in FIG. 2.
Figure 11:
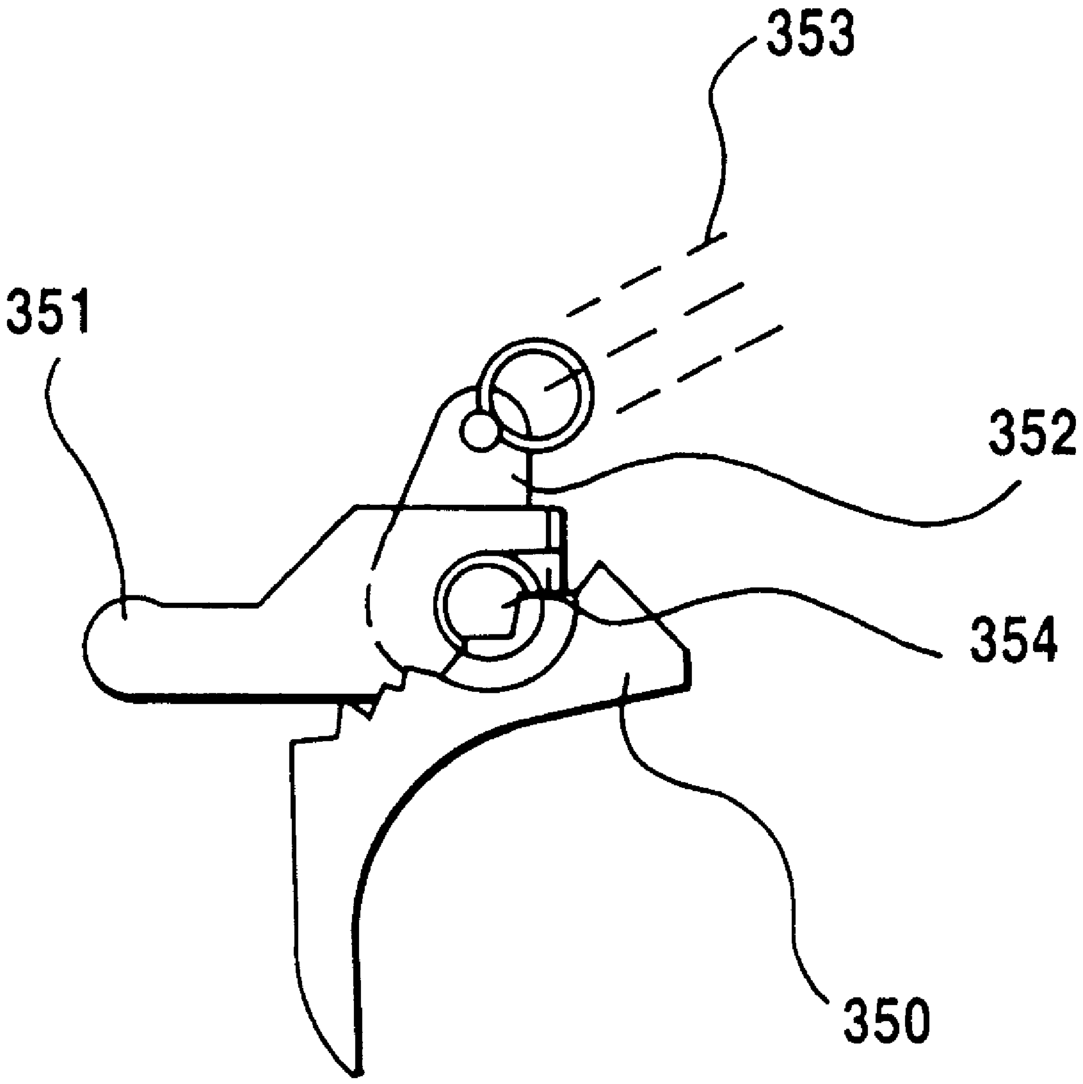
FIG. 11 is a side elevational view of a storage gate mechanism of the storage mechanism shown in FIG. 10.

As shown in FIG. 10, the storage mechanism 35 has a plurality of vertically spaced storage passages 12-1, 12-2, 12-3 branched horizontally from the second feed path 12 and connected to the check storage chambers, respectively. The storage passages 12-1, 12-2, 12-3 have respective storage gate mechanisms 35-5, 35-6, 35-7. As shown in FIG. 11, each of the storage gate mechanisms 35-5, 35-6, 35-7 has a lever 351 rotatable about a shaft 354 and a gate 350 mounted on the lever 351.

A hook 352 is mounted on the lever 351 and connected to a spring 353, which normally urges to turn the lever 351 and the gate 350 counterclockwise about the shaft 354 under weak forces.

As shown in FIG. 10, the storage mechanism 35 also includes an actuation lever 35-3 vertically connected at one end thereof to a solenoid 35-2. The actuation lever 35-3 has three vertically spaced abutments 35-4. The actuation lever 35-3 is normally urged to move downwardly in the direction indicated by the arrow F. A transmissive sensor 35-1 is positioned at an inlet end of the storage mechanism 35.

When the solenoid 35-2 is not energized, the actuation lever 35-3 is displaced downwardly in the direction indicated by the arrow F. Therefore, the levers 351 of the gate mechanisms 35-5, 35-6, 35-7 abut against the respective abutments 35-4 of the actuation lever 35-3, retracting the respective gates 350 out of the second feed path 12.

When the solenoid 35-2 is energized, the actuation lever 35-3 is pulled upwardly, releasing the levers 351 out of abutting engagement with the respective abutments 35-4 of the actuation lever 35-3. The gates 350 of the gate mechanisms 35-5, 35-6, 35-7 are now turned to project into the second feed path 12. After a check 100 fed along the second feed path 12 upwardly into the storage mechanism 35 has passed the transmissive sensor 35-1, the solenoid 35-2 is energized at such a time as to deliver the check 100 into one of the storage passages 12-1, 12-2, 12-3.

Figure 12:
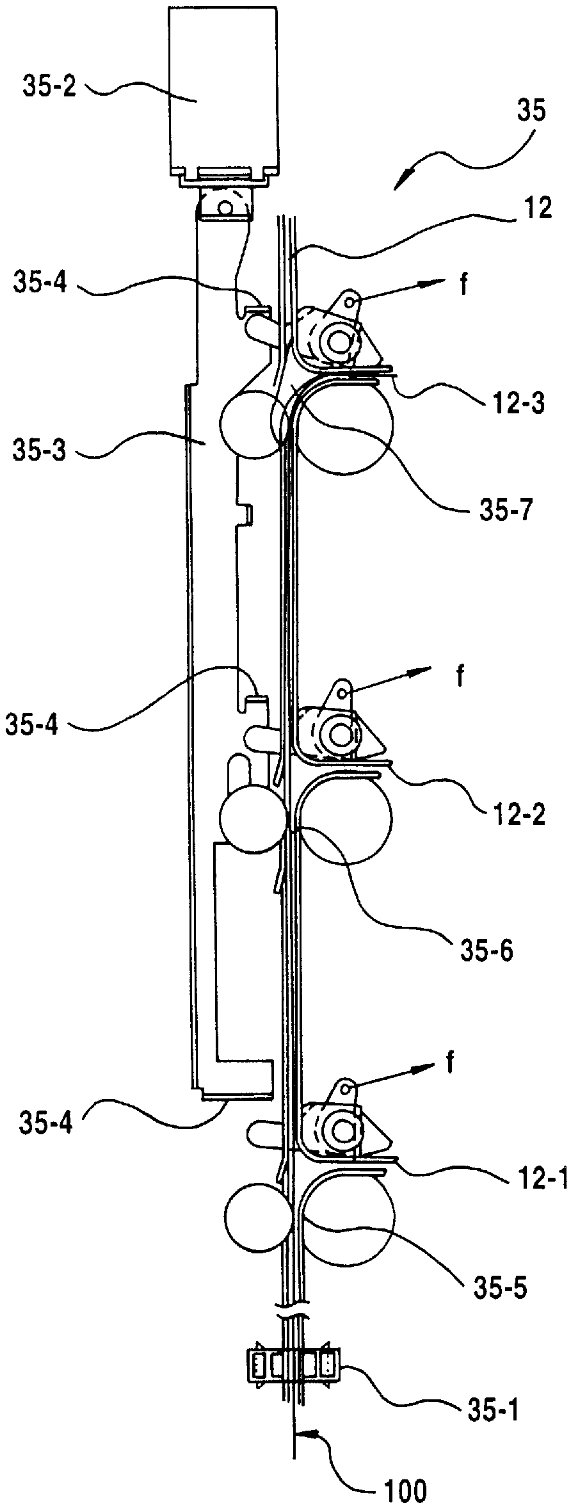
FIG. 12 is a side elevational view illustrating the manner in which the storage mechanism shown in FIG. 10 operates.

The solenoid 35-2 is energized at the time the check 100 passes the gate mechanism 35-6 after having passed the transmissive sensor 35-1, as shown in FIG. 12. The gate 351 of the gate mechanism 35-7 projects into the second feed path 12, deflecting the check 100 into the storage passage 12-3. At this time, the gates 351 of the gate mechanism 35-5, 35-6 tend to turn, but are actually prevented from turning by the check 100 in the second feed path 12.

Under the bias of the springs 353, the gates 351 of the gate mechanism 35-5, 35-6 exert weak pressing forces to the check 100. However, the weak pressing forces applied to the check 100 are not strong enough to prevent the check 100 from moving through the second feed path 12.

Since the check 100 can be delivered selectively into the storage passages 12-1, 12-2, 12-3 by the single solenoid 35-2, the storage mechanism 35 may be relatively simple in structure.

Figure 13:
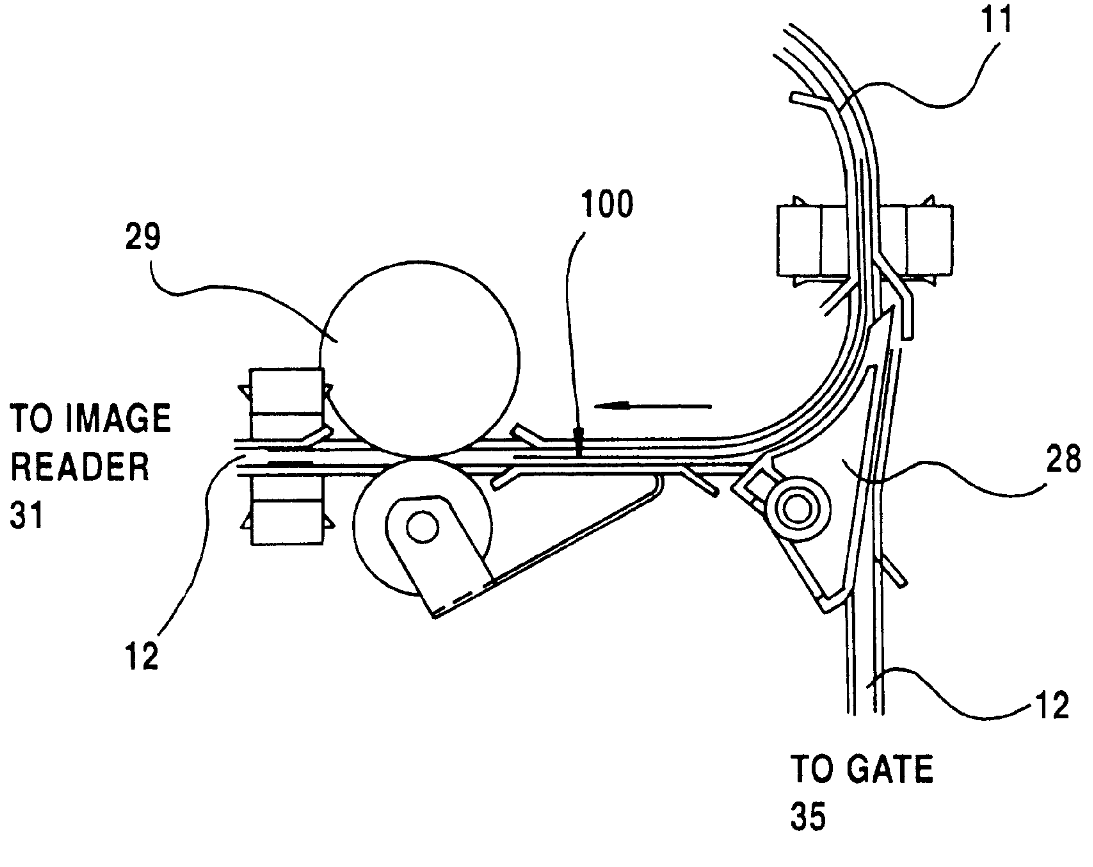
FIG. 13 is a side elevational view of a reversal mechanism of the check deposition mechanism shown in FIG. 2.

The reversal mechanism which includes the switching gate 28 will be described below with reference to FIGS. 13 and 14. For endorsing a check 100 with the printing mechanism 34 in the second feed path 12, it is necessary to reverse the check 100 upside down so that the back side of the check 100 will be printed by the printing mechanism 34. The switching gate 28 is angularly shifted to one side to introduce the check 100 from the first feed path 11 into the image reader 31 in the second feed path 12, as shown in FIG. 13, and angularly shifted to the other side to introduce the check 100 from the storage mechanism 35 in the second feed path 12 back into the first feed path 11, as shown in FIG. 14.

Figure 14:
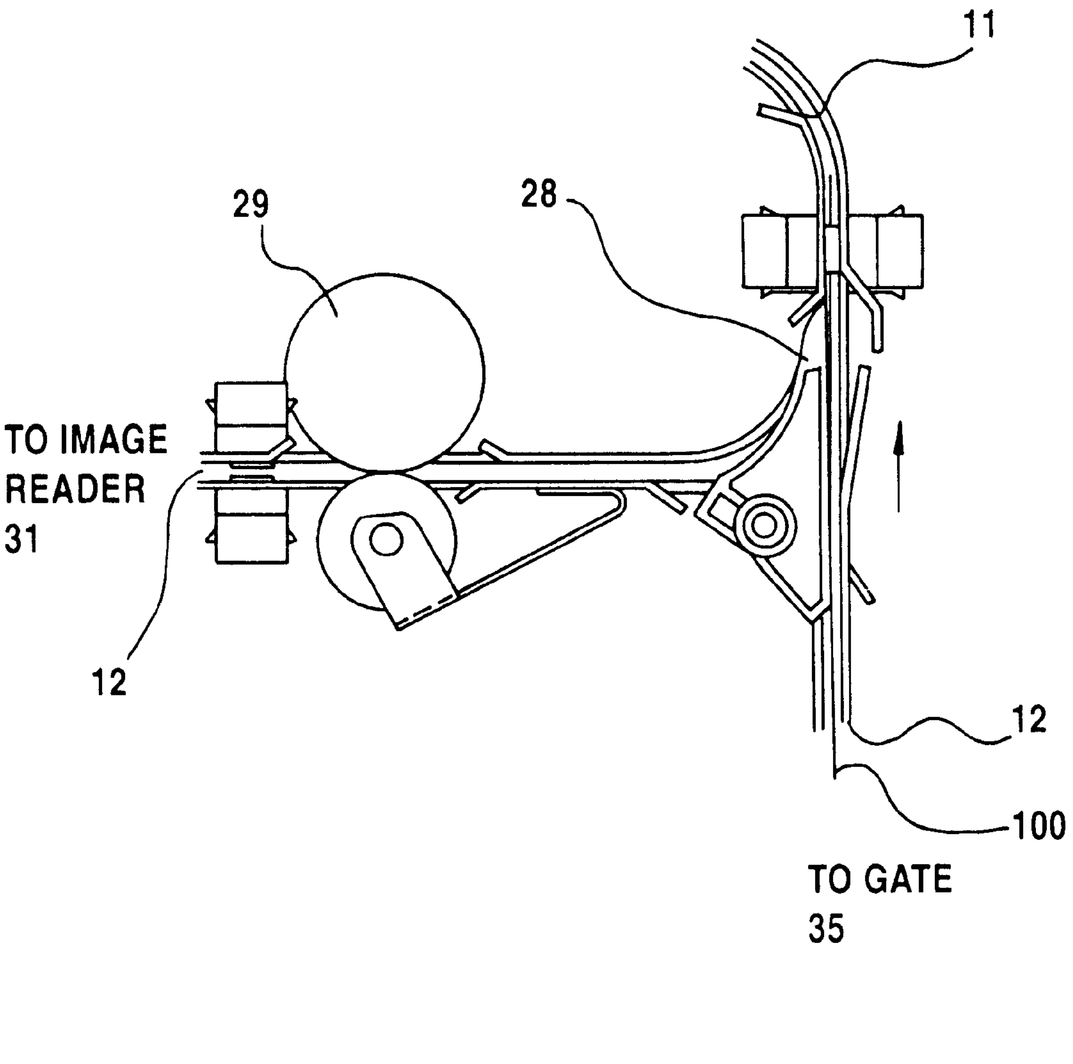
FIG. 14 is a side elevational view illustrating the manner in which the reversal mechanism shown in FIG. 13 operates.

After the check 100 from the storage mechanism 35 in the second feed path 12 is fed back into the first feed path 11 through the switching gate 28, as shown in FIG. 14, the switching gate 28 is angularly moved back and the check 100 is fed back. The check 100 is now fed from the first feed path 11 into the image reader 31 in the second feed path 12.

Because the check 100 has traveled through the looped second feed path 12 once, the check 100 has now been reversed upside down and hence can be endorsed by the printing mechanism 34. The check 100 introduced from the first feed path 11 into the second feed path 12 can be reversed upside down by circulating once through the second feed path 12 into the first feed path 11 and then traveling back from the first feed path 11 into the second feed path 12. Accordingly, the reversal mechanism itself may be relatively small in size and simple in structure.

Figure 15:
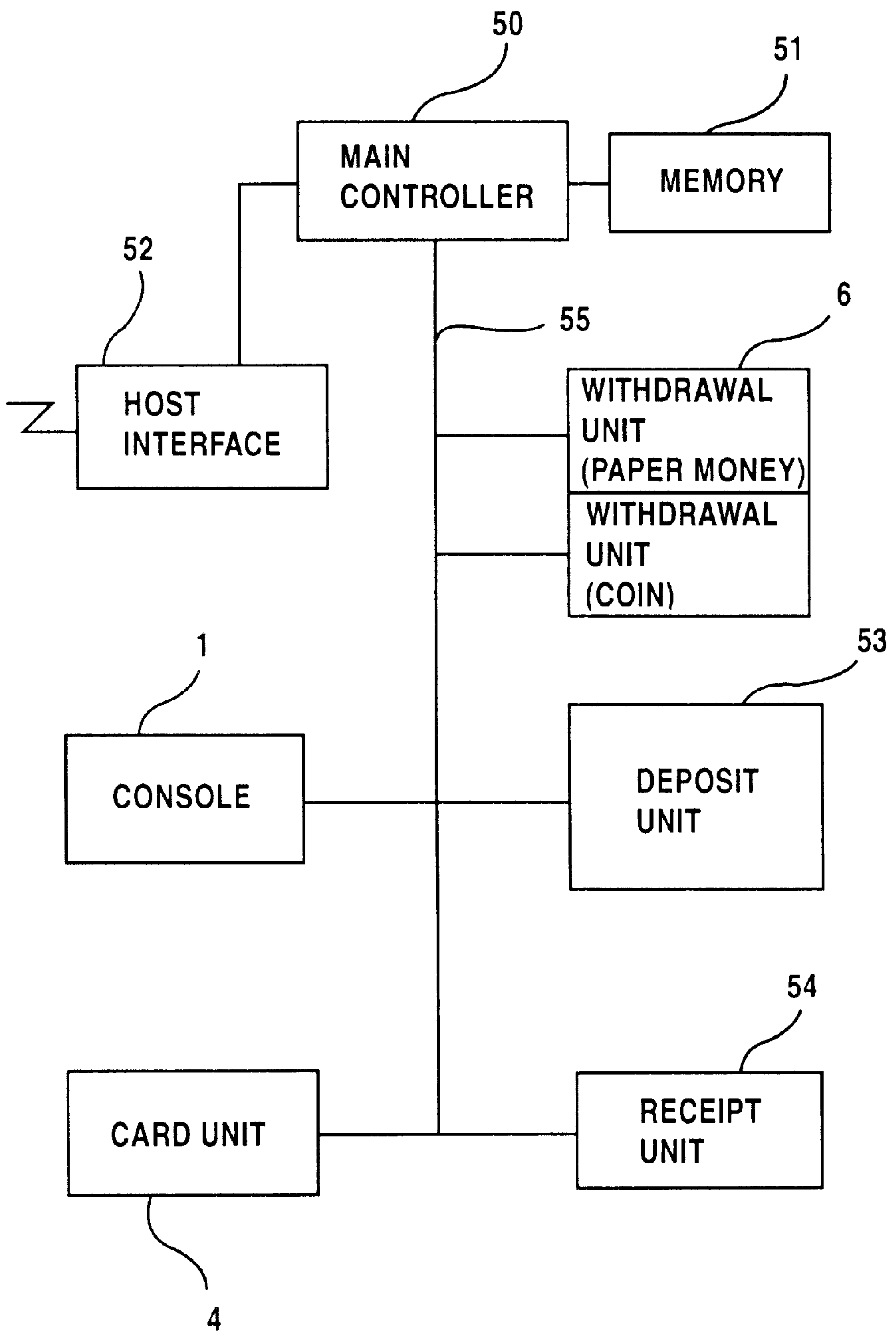
FIG. 15 is a block diagram of a system arrangement of the automatic transaction apparatus shown in FIG. 1.
Figure 16:
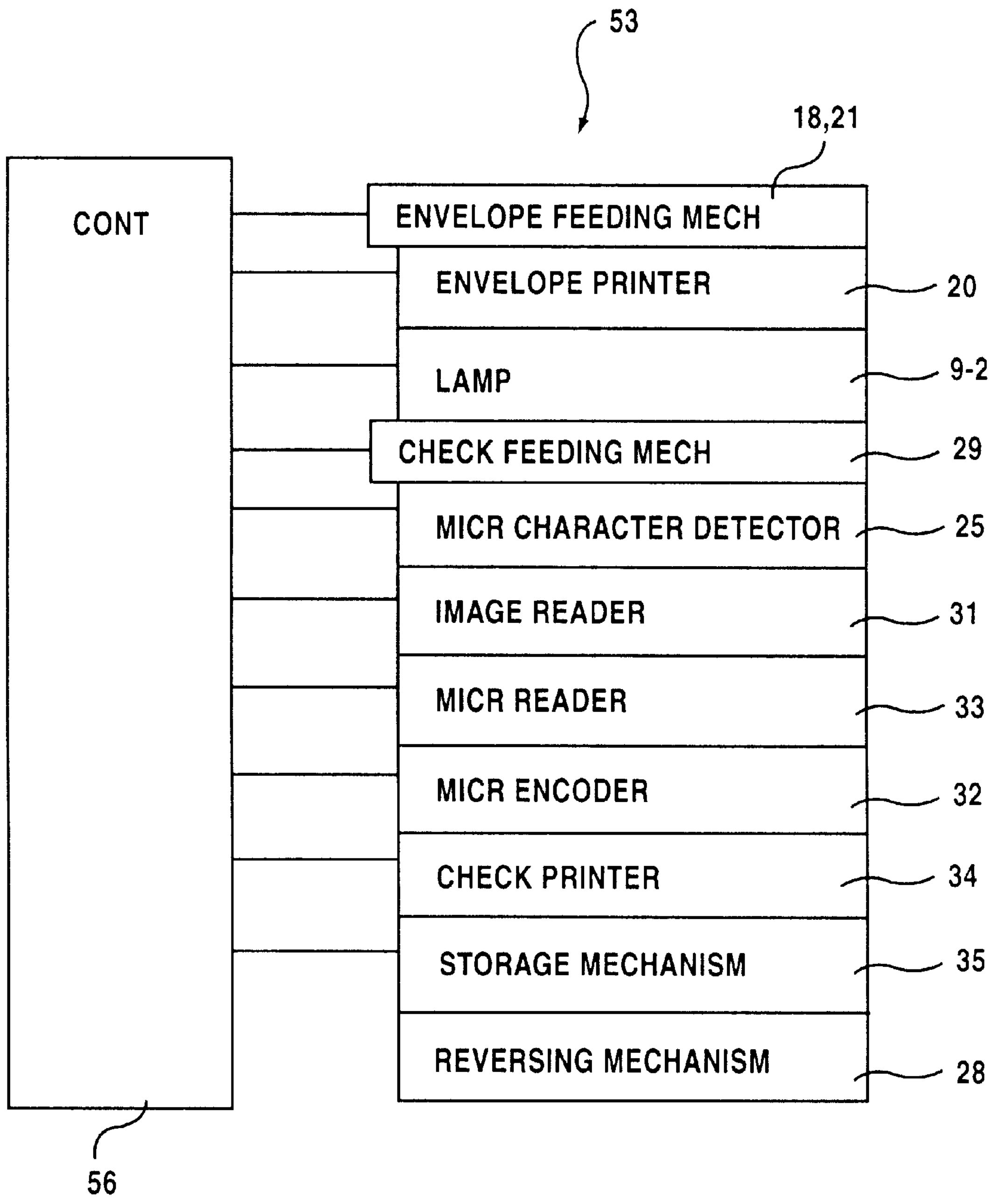
FIG. 16 is a block diagram of a deposition processing unit of the system arrangement shown in FIG. 15.
Figure 17:
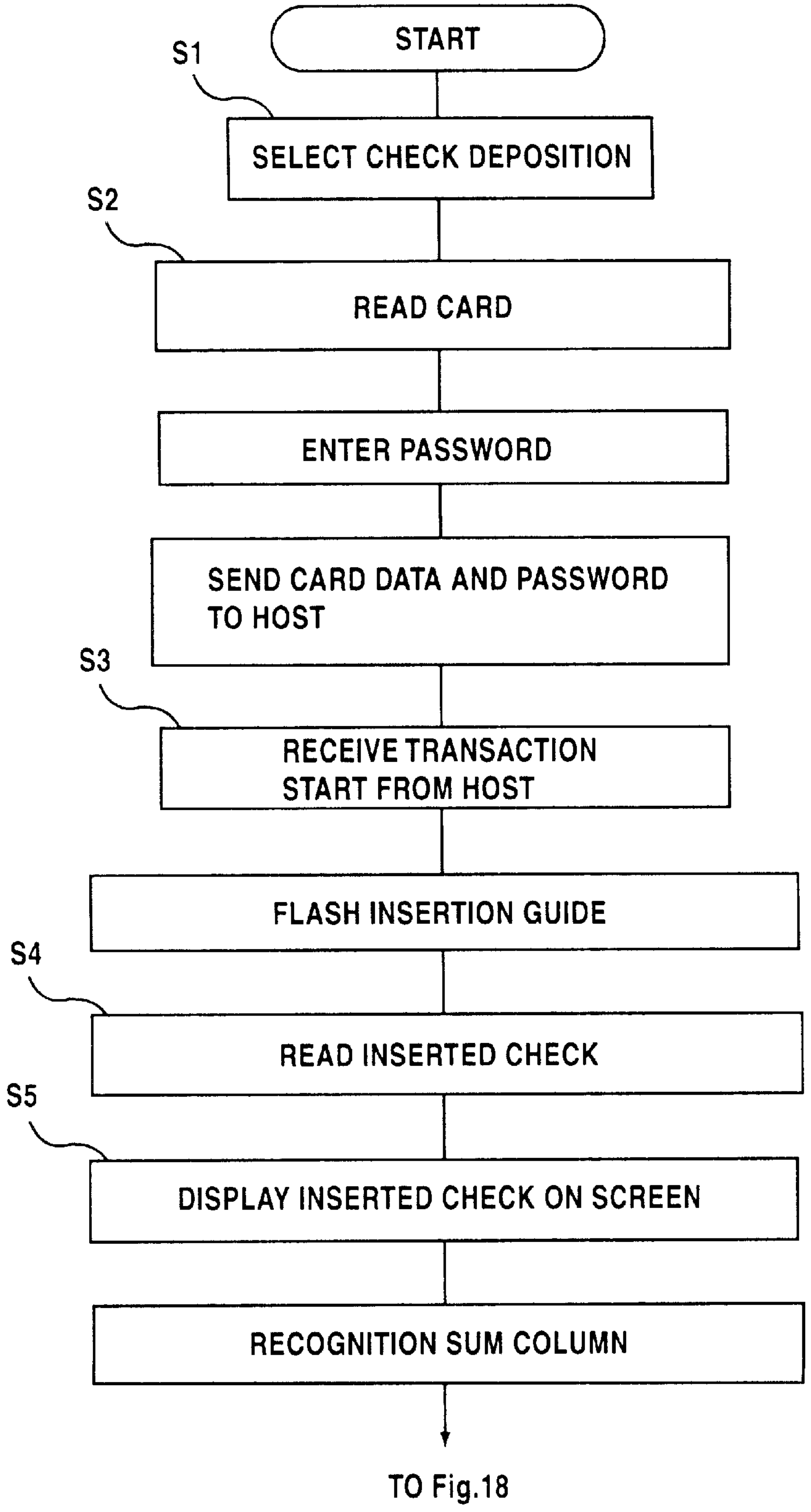
FIGS. 17 and 18 are flowcharts of an operation sequence of the system arrangement shown in FIG. 15.
Figure 18:
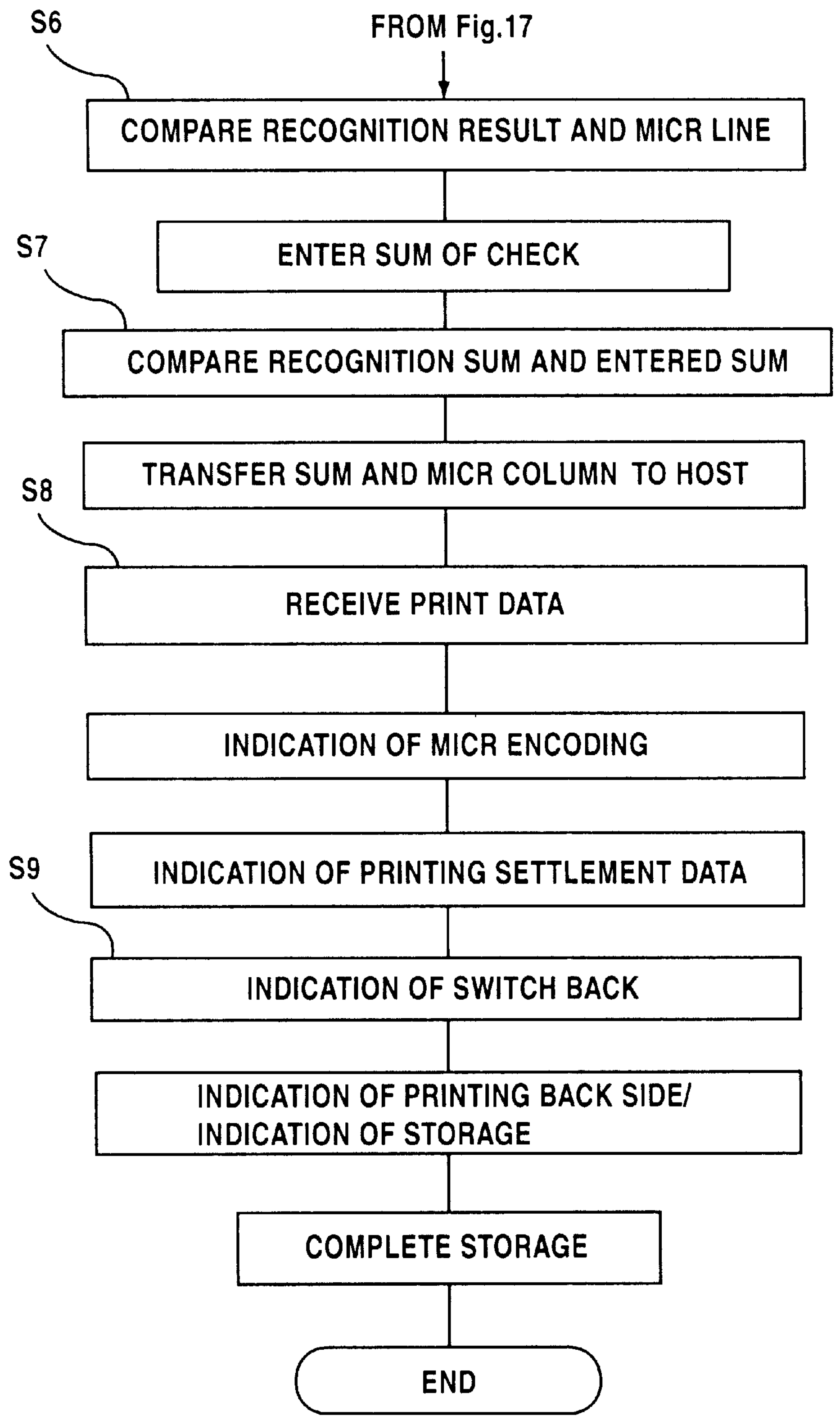

FIG. 15 shows in block form a system arrangement of the automatic transaction apparatus shown in FIG. 1, and FIG. 16 shows in block form a deposition processing unit of the system arrangement shown in FIG. 15.

As shown in FIG. 15, the system arrangement includes a main controller 50, which comprises a processor, connected to a memory 51 that stores a program and data for the main controller 50. A host computer interface 52 connected to the main controller 50 communicates with a host computer (not shown).

The customer-operated console 1 and the card processing unit 4 (see FIG. 1) are connected through a bus 55 to the main controller 50. The withdrawal processing unit 6 (see FIG. 1) is connected through the bus 55 to the main controller 50. The system arrangement also includes a deposit processing 53 for processing deposits from the depository inlet 7. The deposit processing unit 53 is connected through the bus 55 to the main controller 50. The deposit processing unit 53 will be described in detail below with reference to FIG. 16.

A receipt issuing unit 54 for issuing receipts is connected through the bus 55 to the main controller 50.

As shown in FIG. 16, the deposit processing unit 53 has a controller 56 which comprises a microprocessor. The controller 56 serves to control an envelope feed mechanism including the feed rollers 18, 21 (see FIG. 2).

The envelope printer 20 shown in FIG. 2 is controlled by the controller 56. The backlight lamp 9-2 shown in FIG. 3 is also controlled by the controller 56. A check feed mechanism, which includes the transverse shifting rollers 26 and the feed rollers 29 (see FIG. 2), is also controlled by the controller 56.

The magnetic sensor (MICR character detector) 25 described with reference to FIG. 2 is connected to the controller 56. The image reader 31 described with reference to FIG. 2 reads an image of the check 100 and sends the image to the controller 56. The magnetic reader (MICR reader) 33 described with reference to FIG. 2 reads the MICR column of the check 100 and sends the read information to the controller 56.

The encoder (MICR encoder) 32 described with reference to FIG. 2 is controlled by the controller 56 to print MICR characters on the check 100. The printing mechanism (check printer) 34 described with reference to FIG. 2 is controlled by the controller 56 to print information on the check 100. The storage mechanism 35 described with reference to FIG. 2 is controlled by the controller 56 to store checks into desired storage chambers in the storage bin 23.

An operation sequence of the system arrangement shown in FIGS. 15 and 16 will be described below with reference to FIGS. 17 through 23. Numerals with a prefix "S" shown in FIGS. 17 and 18 indicate certain steps of the operation sequence.

Figure 19:
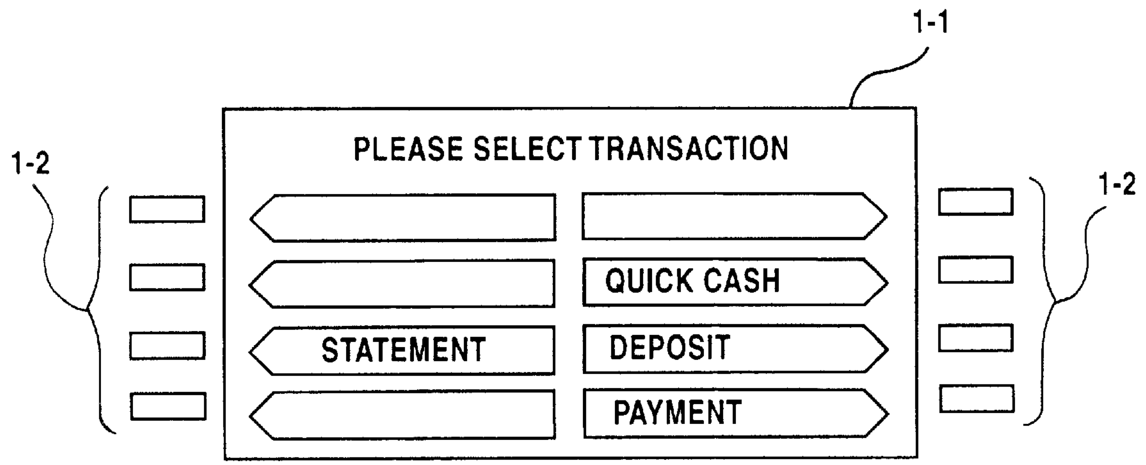
FIG. 19 is a view showing a transaction selection image displayed in the operation sequence shown in FIG. 17.

(S1) The main controller (hereinafter referred to as a processor) 50 displays a transaction selection image shown in FIG. 19 on the display unit 1-1 of the customer-operated console 1. The customer can select transaction items including withdrawal transactions (Quick Cash, Payment), a deposition transaction (Deposit), etc. from the displayed transaction selection image. The customer presses a suitable one of the switches 1-2 to select a desired one of the transaction items.

Figure 20:
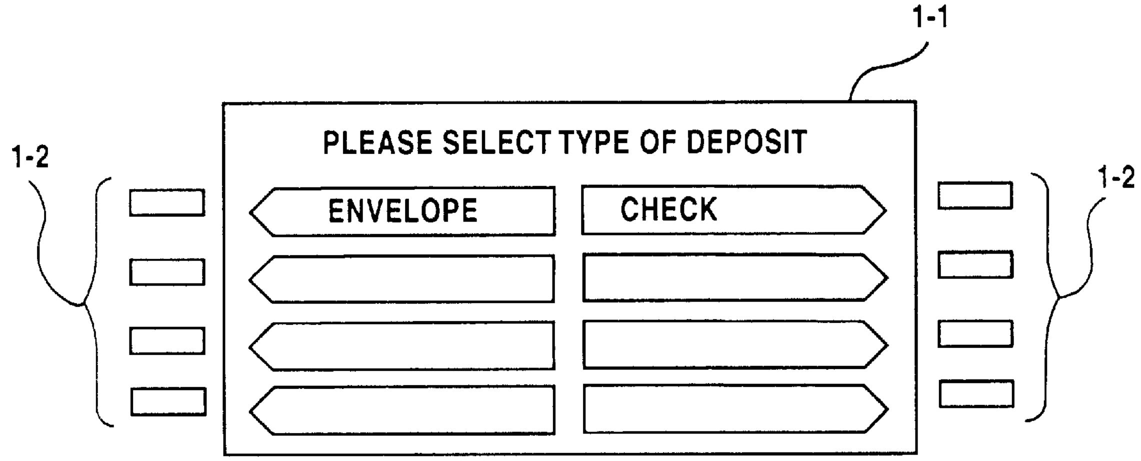
FIG. 20 is a view showing a deposition type selection image displayed in the operation sequence shown in FIG. 17.
Figure 21:
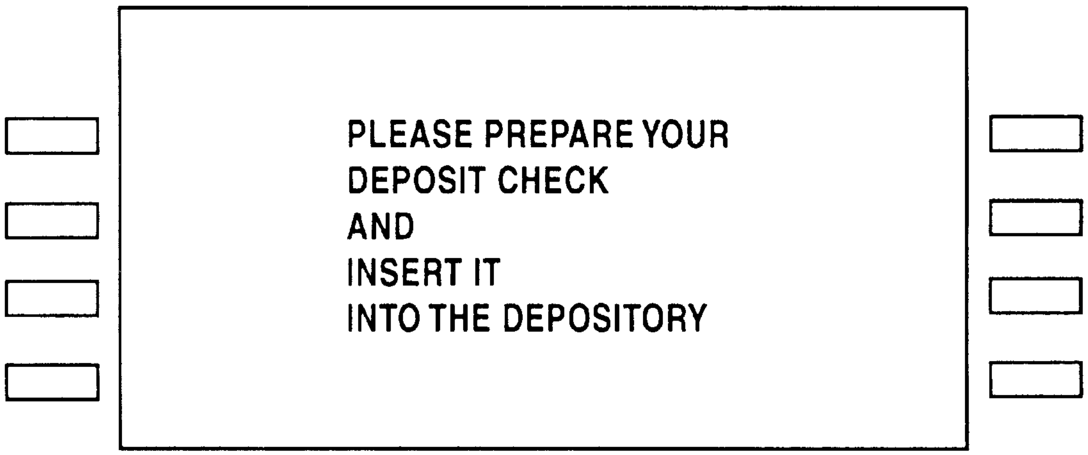
FIG. 21 is a view showing a check insertion guidance image displayed in the operation sequence shown in FIG. 17.
Figure 22:
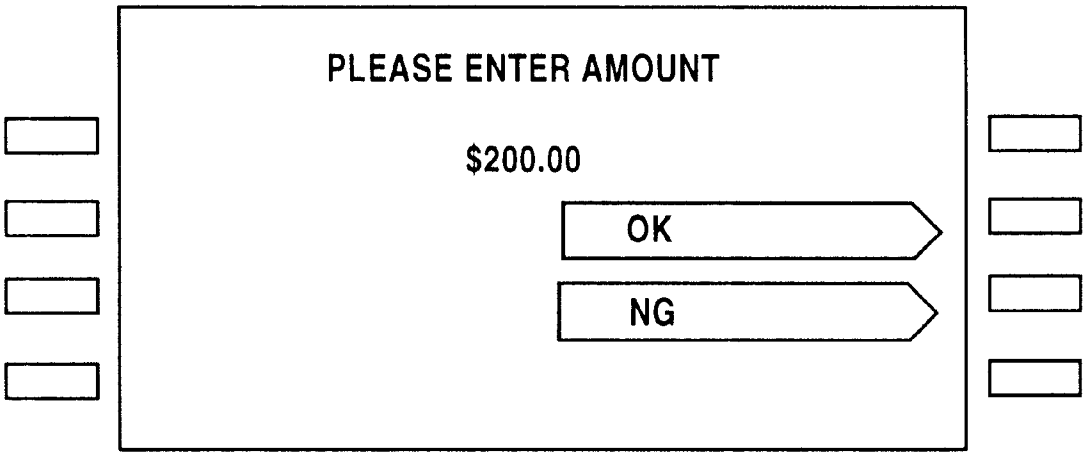
FIG. 22 is a view showing a sum entrance guidance image displayed in the operation sequence shown in FIG. 18.

When the customer selects the deposition transaction, the processor 50 displays a deposition type selection image shown in FIG. 20 on the display unit 1-1 of the customer-operated console 1. The customer selects a deposition type using an envelope or a deposition type using a check from the displayed deposition type selection image. The presses a suitable one of the switches 1-2 to select a desired one of the deposition types.

(S2) If the customer selects the deposition type using a check, then the processor 50 instructs the card processing unit 4 to read the customer's card. The customer inserts the card into the card processing unit 4. The card processing unit 4 reads the inserted card and sends card data to the processor 50.

The processor 50 then displays a password entrance image on the display unit 1-1 of the customer-operated console 1. The customer enters the password using the keys 1-3. The processor 50 transfers the card data and the password to the host computer. The host computer decides whether the transaction is to be permitted or not on the basis of the card data and the password which have been received from the processor 50.

(S3) When the host computer decides to permit the transaction, the host computer sends a transaction starting message to the processor 50. Upon reception of the transaction starting message from the host computer, the processor 50 displays a check insertion guidance image shown in FIG. 21 on the display unit 1-1 of the customer-operated console 1. The processor 50 instructs the controller 56 to flash the backlight lamp 9-2 in the depository inlet 7, whereupon the insertion guidance panel 9-1 is flashed indicating to the customer a proper direction and position in which to insert a check 100. The processor 50 moves the selector lever 17 to select the check feed path 11.

(S4) The processor 50 instructs the controller 56 to read the check 100. As shown in FIG. 2, the check 100 which has been inserted is fed along the check feed path 11, checked for the direction in which it has been inserted, and thereafter transversely shifted. The check 100 is then introduced into the second feed path 12. While being fed along the second feed path 12, the check 100 is read in its entirety by the image reader 31, and thereafter the MICR column 101 of the check 100 is magnetically read by the magnetic reader 33. The processor 50 instructs the controller 56 to stop flashing the backlight lamp 9-2.

(S5) The processor 50 instructs the controller 56 to transfer image data. The controller 56 transfers the image data read by the image reader 31 to the processor 50. The processor 50 then displays an image represented by the transferred image data on the display unit 1-1 of the customer-operated console 1. The customer can now confirm the inserted check 100 on the display unit 1-1.

While the inserted check 100 is being confirmed by the customer, the processor 50 recognizes the characters representing the sum of the check 100 and contents of the MICR column 101 (the code of the banking institution which has issued the check 100, the code of the issuer, and the issuance serial number) from the image data of the sum column 104 of the check 100 and the image data of the MICR column 114 of the check 100.

(S6) The processor 50 compares the contents of the MICR column 101 as read by the magnetic reader 33 and the contents of the MICR column 101 whose characters have been recognized by the processor 50. If the compared contents are not in agreement with each other, then the processor 50 returns the inserted check 100 to the depository inlet 7. If the compared contents are in agreement with each other, then the processor 50 displays a sum entrance guidance image shown in FIG. 22 on the display unit 1-1 of the customer-operated console 1. The customer enters the sum of the check 100 using the keys 1-3.

(S7) The processor 50 compares the recognized sum and the entered sum with each other. If the compared sums are not in agreement with each other, then the processor 50 returns the inserted check 100 to the depository inlet 7. If the compared sums are in agreement with each other, then the processor 50 transfers the sum of the check 100 and the contents of the MICR column 101 to the host computer.

(S8) The host computer settles the check 100, and transfers print data to the processor 50. The processor 50 instructs the controller 56 to encode the sum as MICR data. The MICR encoder 32 prints encoded MICR sum data, among other print data, in an encoded column 107 (see FIG. 23) of the check 100.

Then, the processor 50 instructs the controller 56 to print settlement data (the date of transaction, the account number, etc.) on the check 100. The printing mechanism 34 prints the settlement data, among other print data, in a settlement data column 108 (see FIG. 23) of the check 100.

(S9) If the back side of the check 100 is to be printed, i.e., if the check 100 is to be endorsed, then the processor 50 instructs the controller 56 to switch back the check 100 for thereby reversing the check 100. The controller 56 controls the check feed mechanism to reverse the check 100 upside down as described above with reference to FIGS. 13 and 14.

Then, the processor 50 instructs the controller 56 to print back-side data (the date of transaction, the account number, the sum) on the back side of the check 100. The printing mechanism 34 now prints the back-side data on the back side of the check 100. The processor 50 thereafter instructs the controller 56 to store the check 100. The controller 56 controls the check feed mechanism and the storage mechanism 35 to store the check 23 into the storage bin 23, as shown in FIGS. 10 through 12. The controller 56 then indicates the completion of the check storing action to the processor 50. The process of depositing the check 100 is now finished.

Since the depository inlet 7 is combined with the insertion guidance panel 9-1 that can be illuminated by the backlight lamp 9-2, the user can be guided by the insertion guidance panel 9-1 as to the face side of the check 100 which is to be directed upwardly at the depository inlet 7 and the orientation in which the check 100 is to be inserted into the depository inlet 7, and also as to the position where the check 100 is to be inserted into the depository inlet 7. Since the user is guided to insert the check 100 in a proper direction and at a proper position into the depository inlet 7, the check deposition mechanism of the automatic transaction apparatus may be relatively simple in structure and may process the inserted check 100 within a relatively short period of time.

The insertion guidance panel 9-1 may be continuously turned on or flashed by the backlight lamp 9-2 when the user wants to deposit the check 100. Therefore, the user can easily recognize the inlet slot for insertion of the check 100, the position in which to insert the check 100, and the orientation in which to insert the check 100.

While the depository inlet 7 is also used to insert envelopes, the insertion guidance panel 9-1 is positioned so as to indicate, to the user, the position to insert the check 100 which is narrower than envelopes. Accordingly, the user is guided to recognize the proper position in which to insert the check 100 in contrast to the position in which to insert envelopes. Because the check 100 is inserted through the proper position, the check deposition mechanism may be relatively simple in structure as it does not need to receive checks inserted in different positions.

The automatic transaction apparatus has the mechanism for detecting the manner in which checks have been inserted, so that only those checks which are properly inserted can be introduced into the check deposition mechanism. Furthermore, since the inserted check 100 is strongly transversely shifted in the first feed path 11, the transverse shifting of the check 100 is completed before the check 100 is fed into the second feed path 12. In the second feed path 12, the check 100 that has already been transversely shifted in the first feed path 11 is weakly transversely shifted and hence remains transversely shifted while being fed along the second feed path 12.

FIGS. 24, 25, 26A, and 26B show a depository structure according to another embodiment of the present invention. Those parts shown in FIGS. 24, 25, 26A, and 26B which are identical to those shown in FIG. 4 are denoted by identical reference numerals, and will not be described in detail below.

Figure 24:
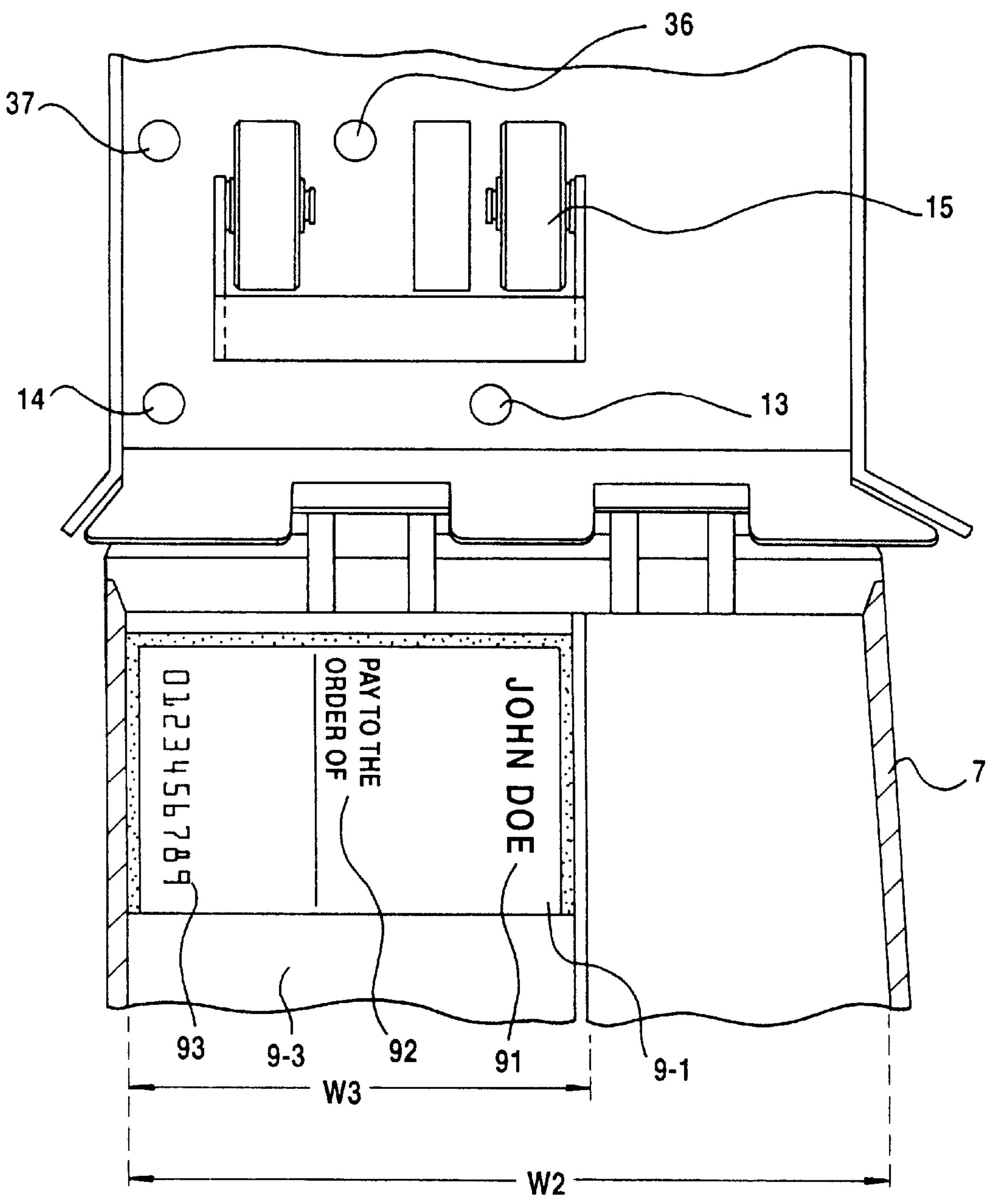
FIG. 24 is a fragmentary plan view of a depository structure according to another embodiment of the present invention.
Figure 25:
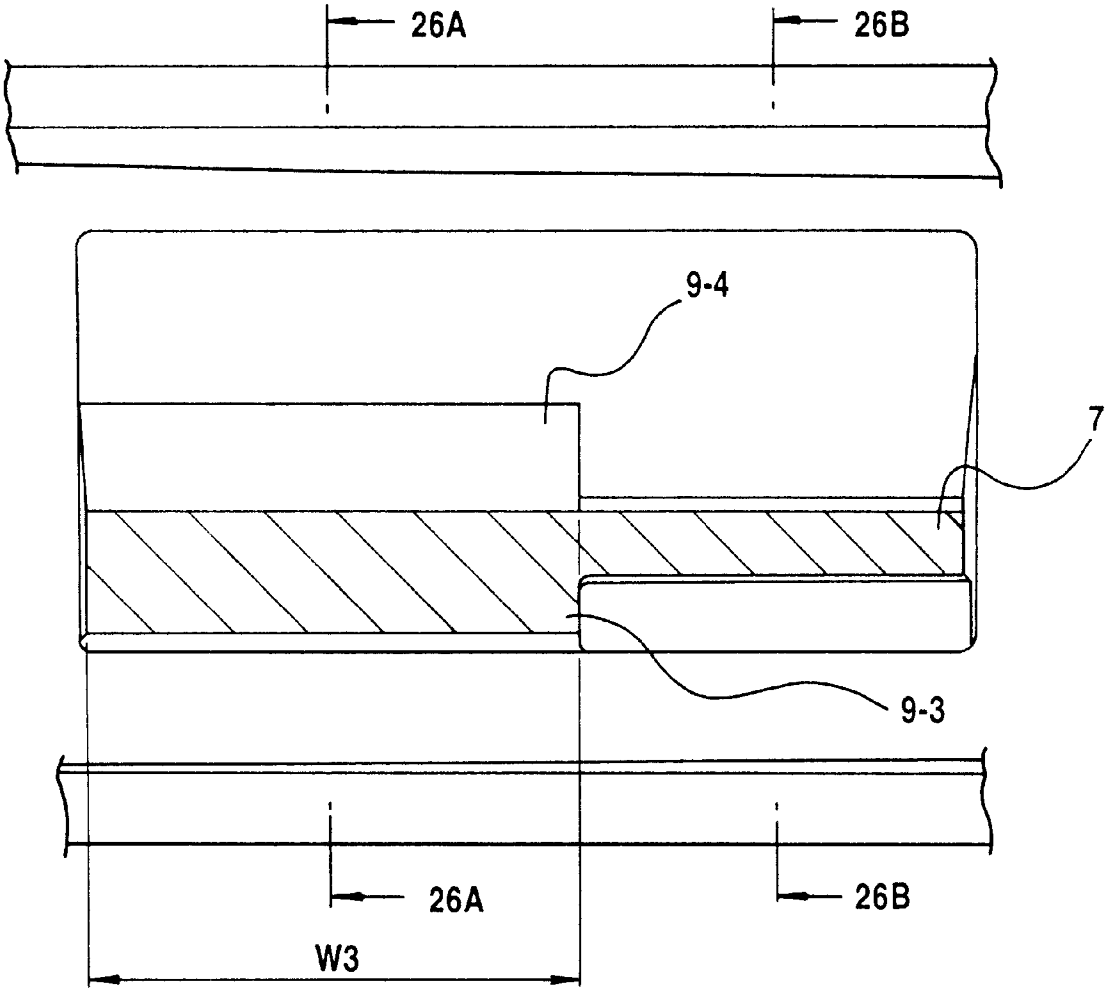
FIG. 25 is a front elevational view of the depository structure shown in FIG. 24.
Figure 26A:
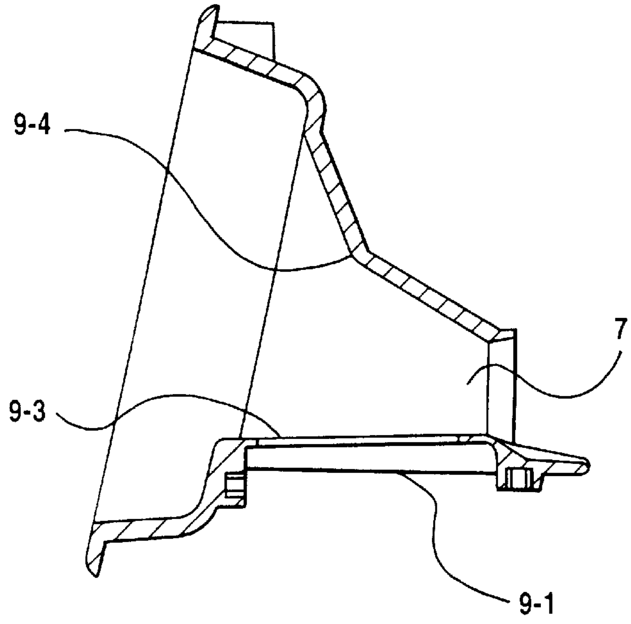
FIG. 26A is a cross-sectional view taken along line 26A—26A of FIG. 25.
Figure 26B:
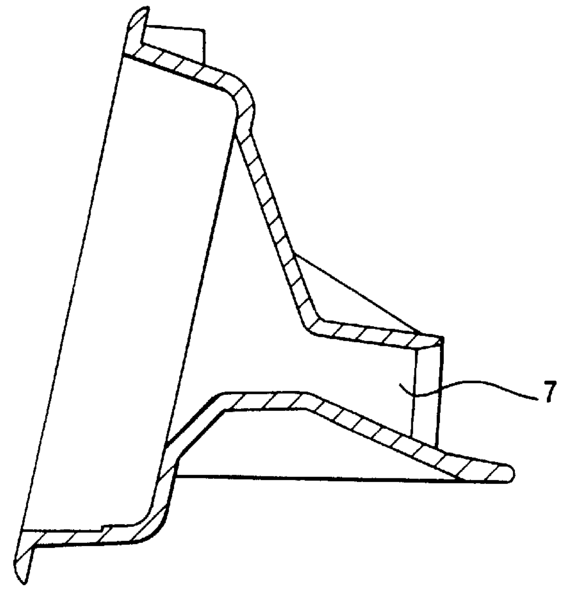
FIG. 26B is a cross-sectional view taken along line 26B—26B of FIG. 25.
Figure 27:
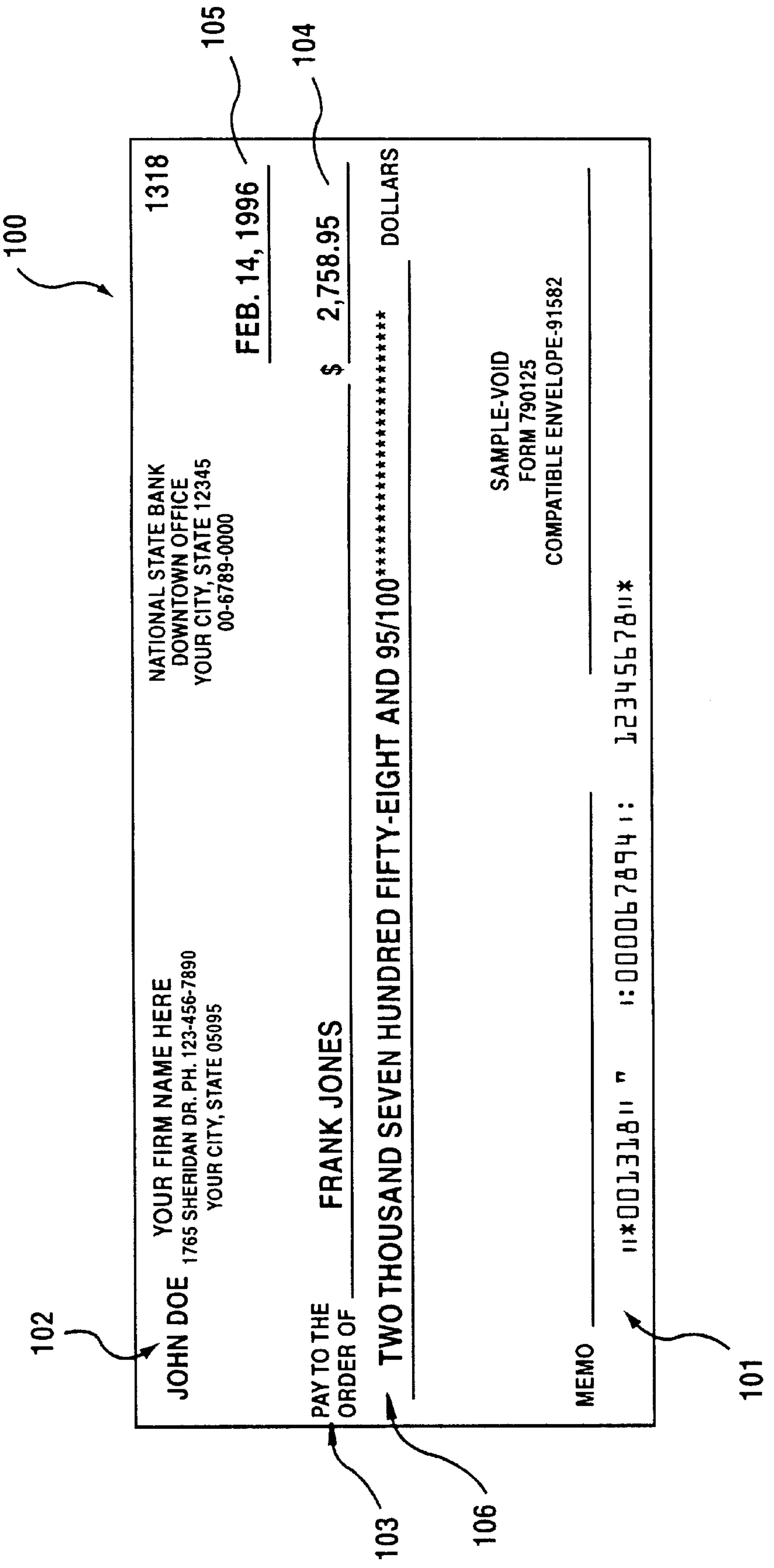
FIG. 27 is a view of a check used in conjunction with conventional automatic transaction apparatus.

As shown in FIG. 24, the insertion guidance panel 9-1 has a width W3 equal to the width of personal checks that are used most often, plus the width of a clearance. The insertion guidance panel 9-1 is positioned such that its left edge, as viewed from above, is aligned with the left edge of the depository inlet 7. As shown in FIGS. 25, 26A, and 26B, the depository inlet 7 has an upper guide slot 9-4 and a lower guide slot 9-3, which are aligned with the insertion guidance panel 9-1. Each of the upper and lower guide slots 9-4, 9-3 has a width equal to the width W3 of the insertion guidance panel 9-1. The insertion guidance panel 9-1 is positioned beneath the lower guide slot 9-3.

Figure 23:
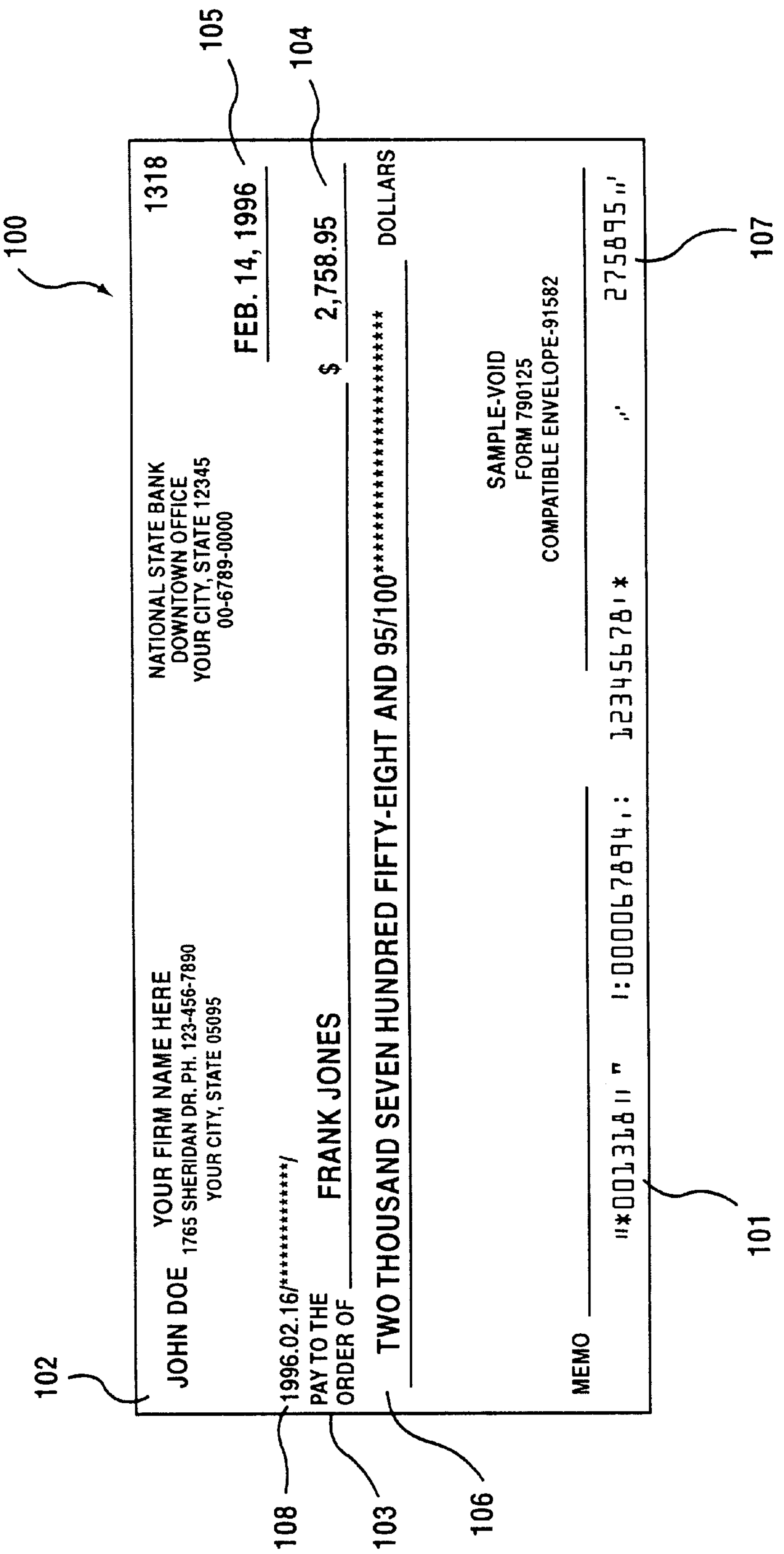
FIG. 23 is a view of a check used in the automatic transaction apparatus shown in FIG. 1.

The insertion guidance panel 9-1 indicates thereon a pattern on the face of the personal check 100 (see FIG. 23).

Specifically, the insertion guidance panel 9-1 indicates thereon a column 91 showing an issuer's name, a column 92 showing a party to which the check is payable, and an MICR column 93.

When the check 100 is inserted into the depository inlet 7, the check 100 is guided through the upper and lower guide slots 9-4, 9-3. Therefore, the check 100 can be inserted at a proper position into the depository inlet 7, and hence the check deposition mechanism may be relatively simple in structure as it does not need to receive checks inserted in different positions.

In the illustrated embodiments, the check 100 has been described as a financial document that can be handled by the automatic transaction apparatus. However, the automatic transaction apparatus may process other financial documents such as money transfer slips.

The automatic transaction apparatus has been illustrated as being capable of handling both deposits and withdrawals. However, the present invention is also applicable to an automatic transaction apparatus which can process deposits only.

While the depository inlet 7 has been described as receiving both envelopes and checks, it may be of such a structure as to receive checks having different widths.

The automatic transaction apparatus according to the present invention offers the following advantages:

The guidance mechanism 9 indicates a proper pattern for inserting financial documents at the depository inlet 7. According to the proper pattern indicated by the guidance mechanism 9, the user can insert a financial document with its opposite sides properly directed and in a proper orientation. Since financial documents are properly inserted into the automatic transaction apparatus, they can automatically be deposited by a relatively simple deposition mechanism including readers and a printing mechanism.

The automatic transaction apparatus can process deposits in the form of financial documents in a relatively short period of time for the convenience of users.

Although certain preferred embodiments of the present invention have been shown and described in detail, it should be understood that various changes and modifications may be made therein without departing from the scope of the appended claims.

What is claimed is:

1. An automatic transaction apparatus for automatically settling financial documents deposited by users, comprising:

a depository inlet for receiving a financial document deposited by a user;

document feed means for feeding the financial document received by said depository inlet;

reading means for reading transaction data from the financial document;

printing means for printing a transactional result on the financial document;

storage means for storing the financial document; and guidance means disposed in said depository inlet, for indicating a pattern in which to insert the financial document into said depository inlet.

2. An automatic transaction apparatus according to claim 1, wherein said guidance means comprises:

a display panel for indicating said pattern to insert the financial document into said depository inlet; and light-emitting means for illuminating said display panel.

3. An automatic transaction apparatus according to claim 2, further comprising:

selecting means operable by the user, for selecting a financial document settling mode to settle the financial document; and control means for energizing said light-emitting means in response to selection of said financial document settling mode by the user through said selecting means.

4. An automatic transaction apparatus according to claim 1, wherein said guidance means has a width smaller than a width of said depository inlet.

5. An automatic transaction apparatus according to claim 4, wherein said guidance means has a guide for guiding the financial document.

6. An automatic transaction apparatus according to claim 4, wherein said depository inlet has a width for receiving an envelope enclosing a deposit, further comprising:

envelope feeding means for feeding the envelope to said storage means;

selecting means operable by the user, for selecting either a financial document settling mode to settle the financial document or an envelope processing mode to process said envelope; and gate means responsive to selection of said envelope processing mode by the user through said selecting means, for delivering the envelope inserted into said depository inlet to said envelope feeding means, and also responsive to selection of said financial document settling mode by the user through said selecting means, for delivering the financial document inserted into said depository inlet to said document feed means.

7. An automatic transaction apparatus according to claim 1, wherein said guidance means is disposed in said depository inlet, for indicating a position at which to insert the financial document into said depository inlet.

8. An automatic transaction apparatus according to claim 1, further comprising:

detecting means disposed between said depository inlet and said reading means, for detecting the manner in which the financial document has been inserted from said depository inlet; and control means for returning the financial document to said depository inlet when the financial document has improperly been inserted from said depository inlet as detected by said detecting means.

9. An automatic transaction apparatus according to claim 8, wherein said document feed means comprises:

a first feed path for feeding the financial document from said depository inlet to a first position;

a second feed path feeding the financial document from said first position through said reading means, said printing means, and said storage means back to said first position; and a switching gate disposed in said first position for reversing the financial document upside down.

10. An automatic transaction apparatus according to claim 8, wherein said document feed means comprises:

a first feed path for feeding the financial document from said depository inlet to a first position; and a second feed path feeding the financial document from said first position through said reading means, said printing means, and said storage means back to said first position;

said first feed path having a first transversely shifting mechanism for transversely shifting the financial document under a relatively strong force;

said second feed path having a second transversely shifting mechanism for transversely shifting the financial document under a relatively weak force.

11. An automatic transaction apparatus according to claim 1, further comprising:

card reading means for reading a card which has recorded transaction data of a user;

input means operable by the user for selecting a deposition transaction or a withdrawal transaction;

withdrawing means for withdrawing cash in an amount indicated by the user through said input means; and control means for receiving the financial document from said depository inlet in response to selection of the deposition transaction.

12. An automatic transaction apparatus according to claim 1, wherein said reading means comprises:

a magnetic reader for reading magnetic information of the financial document; and an image reader for optically reading the financial document;

said printing means having a printing mechanism for printing the financial document with magnetic ink.

13. An automatic transaction apparatus according to claim 5, wherein said guide is disposed in a lower portion of said depository inlet.

14. An automatic transaction apparatus according to claim 5, wherein said guide is disposed in each of upper and lower portions of said depository inlet.

* * * * *